US008797360B2

(12) United States Patent
Shinohara

(10) Patent No.: US 8,797,360 B2
(45) Date of Patent: Aug. 5, 2014

(54) IMAGE DISPLAY DEVICE, METHOD FOR CONTROLLING IMAGE DISPLAY DEVICE, AND INFORMATION STORAGE MEDIUM

(75) Inventor: Takayuki Shinohara, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 953 days.

(21) Appl. No.: 12/937,883

(22) PCT Filed: Dec. 9, 2008

(86) PCT No.: PCT/JP2008/072342
§ 371 (c)(1),
(2), (4) Date: Nov. 22, 2010

(87) PCT Pub. No.: WO2009/128181
PCT Pub. Date: Oct. 22, 2009

(65) Prior Publication Data
US 2011/0261076 A1 Oct. 27, 2011

(30) Foreign Application Priority Data

Apr. 18, 2008 (JP) ................. 2008-109659
Apr. 18, 2008 (JP) ................. 2008-109660
Apr. 18, 2008 (JP) ................. 2008-109661

(51) Int. Cl.
*G09G 5/37* (2006.01)
*G06T 15/20* (2011.01)
*G06T 19/00* (2011.01)
*A63F 13/10* (2006.01)

(52) U.S. Cl.
CPC ......... *A63F 13/10* (2013.01); *A63F 2300/6676* (2013.01); *G06T 15/20* (2013.01); *G06T 19/00* (2013.01)
USPC .......................................... 345/650; 345/427

(58) Field of Classification Search
CPC ......... G06T 15/10; G06T 15/20; G06T 17/00; G06T 19/00; G06F 3/04815
See application file for complete search history.

(56) References Cited

U.S. PATENT DOCUMENTS 5,590,268 A * 12/1996 Doi et al. ...................... 715/848
5,912,671 A    6/1999 Oka
(Continued)

FOREIGN PATENT DOCUMENTS

EP        1363246 A1    11/2003
JP     2000339490 A    12/2000
(Continued)

OTHER PUBLICATIONS

International Search Report for coresponding PCT Application No. PCT/JP2008/072342, Feb. 3, 2009.
(Continued)

*Primary Examiner* — Kee M Tung
*Assistant Examiner* — Michelle Chin
(74) *Attorney, Agent, or Firm* — Matthew B. Dernier, Esq.; Gibson & Dernier LLP

(57) ABSTRACT

Provided is an image display device capable of easily displaying an image depicting the deep side of a point of gaze when an operation to change a pitch angle of a viewpoint is performed by a user. The image display device displays an image rendering a scene viewed from a viewpoint in a virtual space in a line of sight, and performs at least one of a process of moving a position of the viewpoint and a process of changing the line of sight, according to a viewpoint moving operation performed by the user. The image display device also calculates a position of a pitch angle change center point which exists on a straight line extending from the viewpoint in the line of sight, changes the pitch angle of the viewpoint about the pitch angle change center point according to the pitch angle change operation performed by the user, and changes the line of sight so that the line of sight is directed to the pitch angle change center point from the position of the viewpoint with the pitch angle thus changed.

20 Claims, 22 Drawing Sheets

(56) References Cited

U.S. PATENT DOCUMENTS

| | | | |
|---|---|---|---|
| 6,685,366 B1 * | 2/2004 | Corbin | 396/427 |
| 2004/0141014 A1 | 7/2004 | Kamiwada et al. | |
| 2006/0103650 A1 | 5/2006 | Kamiwada et al. | |
| 2009/0245691 A1 * | 10/2009 | Naimark et al. | 345/419 |
| 2011/0018867 A1 * | 1/2011 | Shibamiya et al. | 345/419 |

FOREIGN PATENT DOCUMENTS

| | | | |
|---|---|---|---|
| JP | 2001353358 A | 12/2001 | |
| JP | 2004341572 A1 | 12/2004 | |
| JP | 2006214999 A | 8/2006 | |
| JP | 2007299330 A | 11/2007 | |
| WO | 02069276 A1 | 9/2002 | |

OTHER PUBLICATIONS

JP Office Action for corresponding JP Patent Application No. 2008-109660, dated Nov. 15, 2011.

International Preliminary Report on Patentability for corresponding PCT Application No. PCT/JP2008/072342, Nov. 30, 2010.

JP Office Action for corresponding JP Patent Application No. 2008-109661, dated Aug. 14, 2012.

* cited by examiner

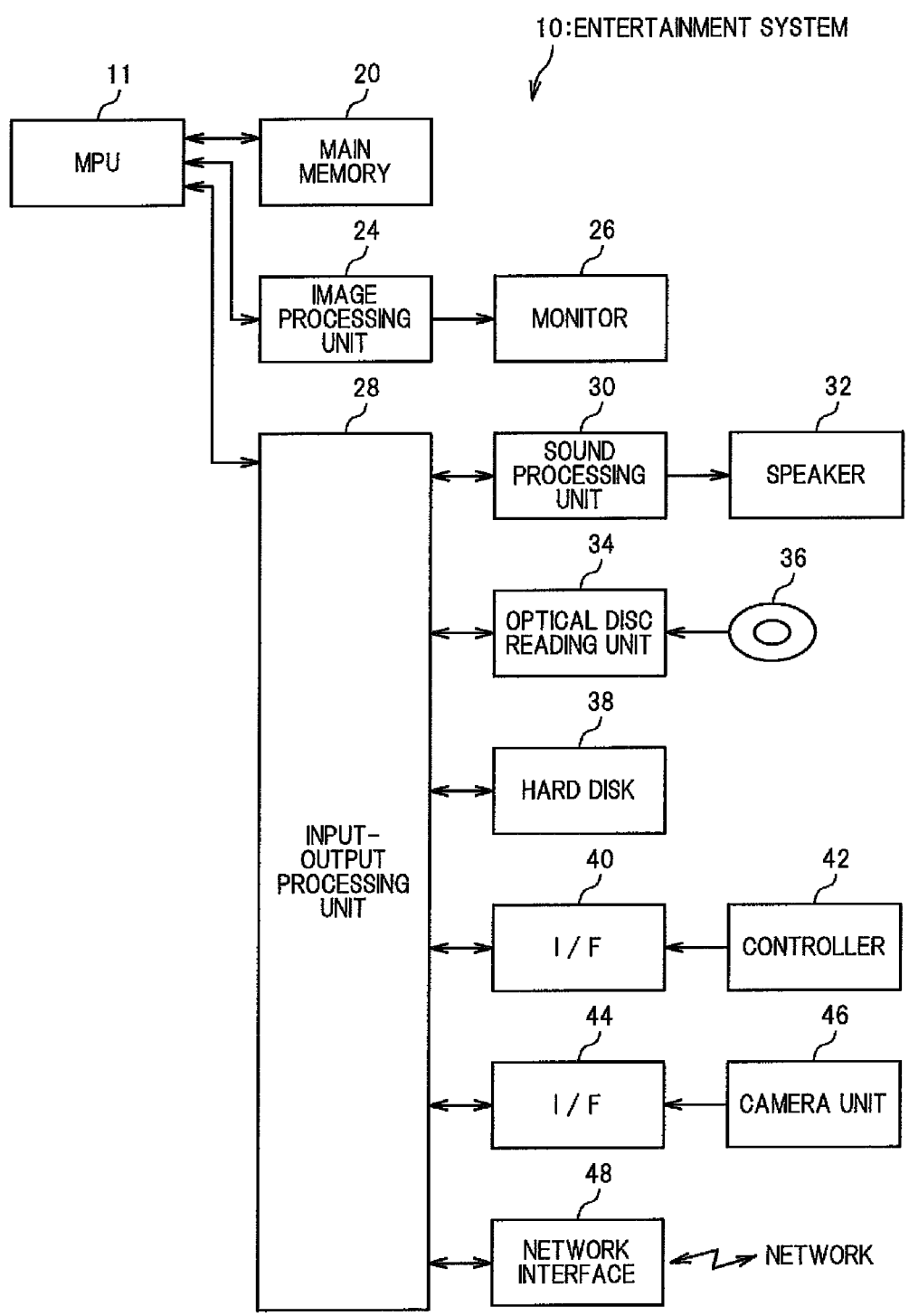

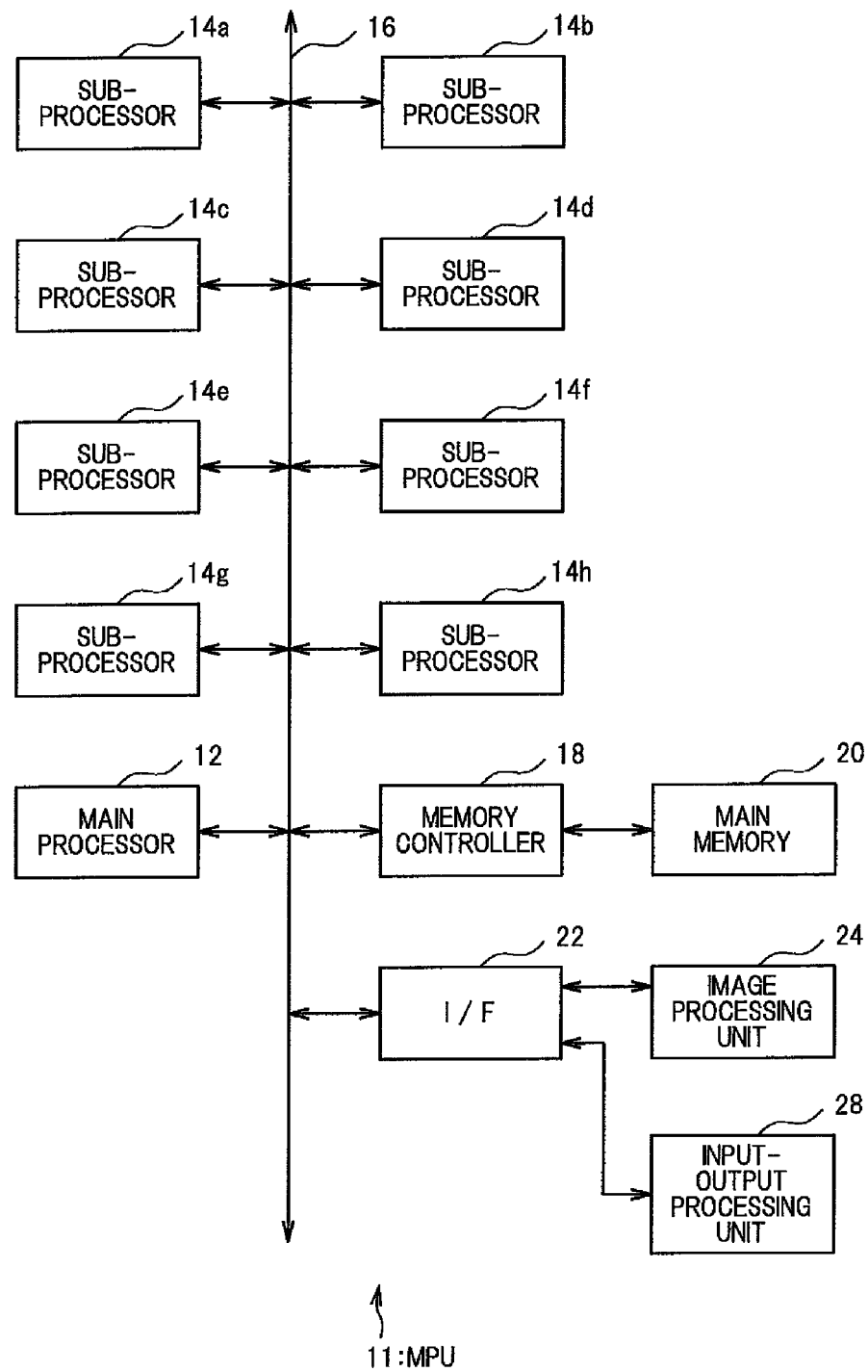

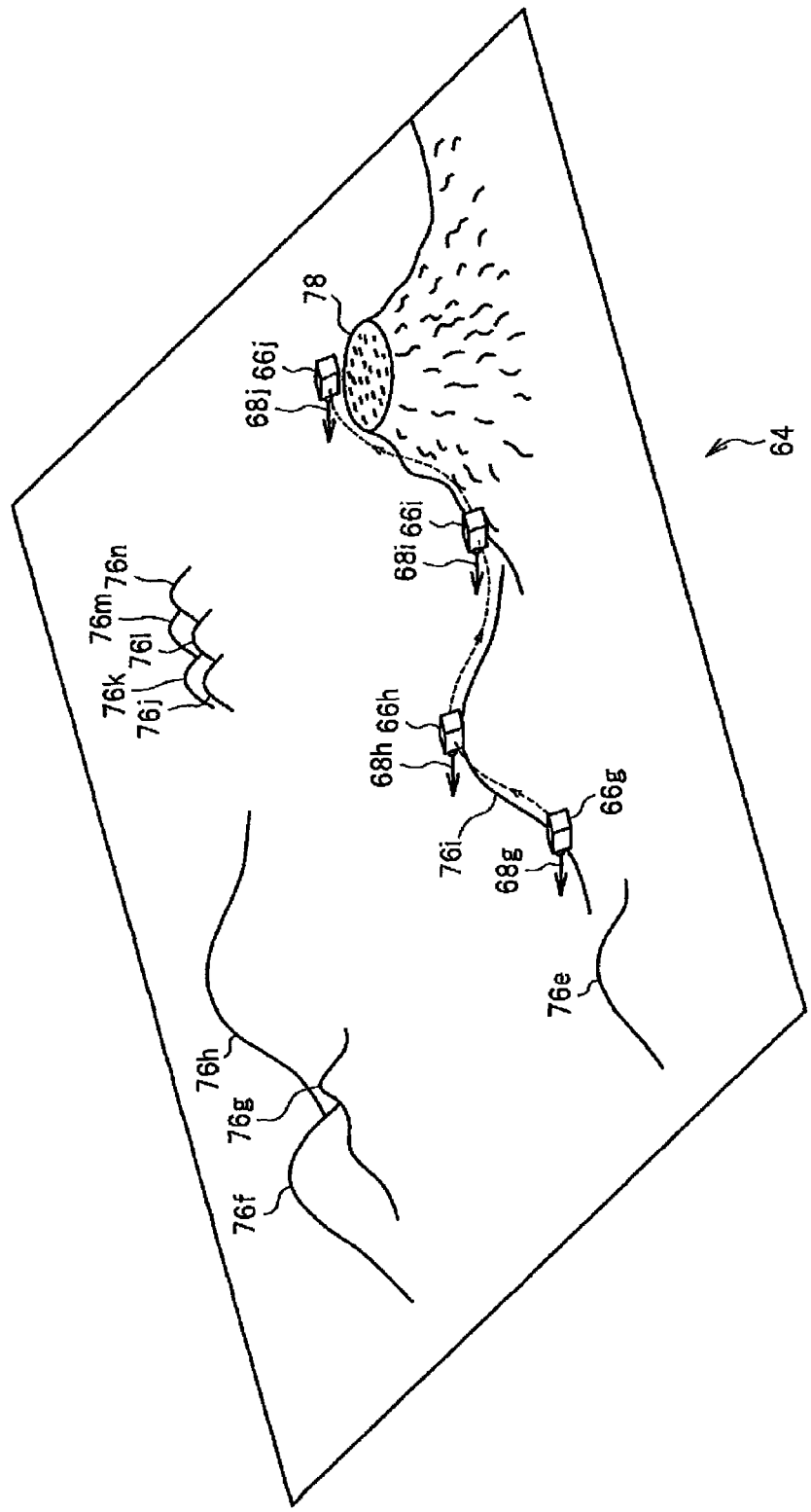

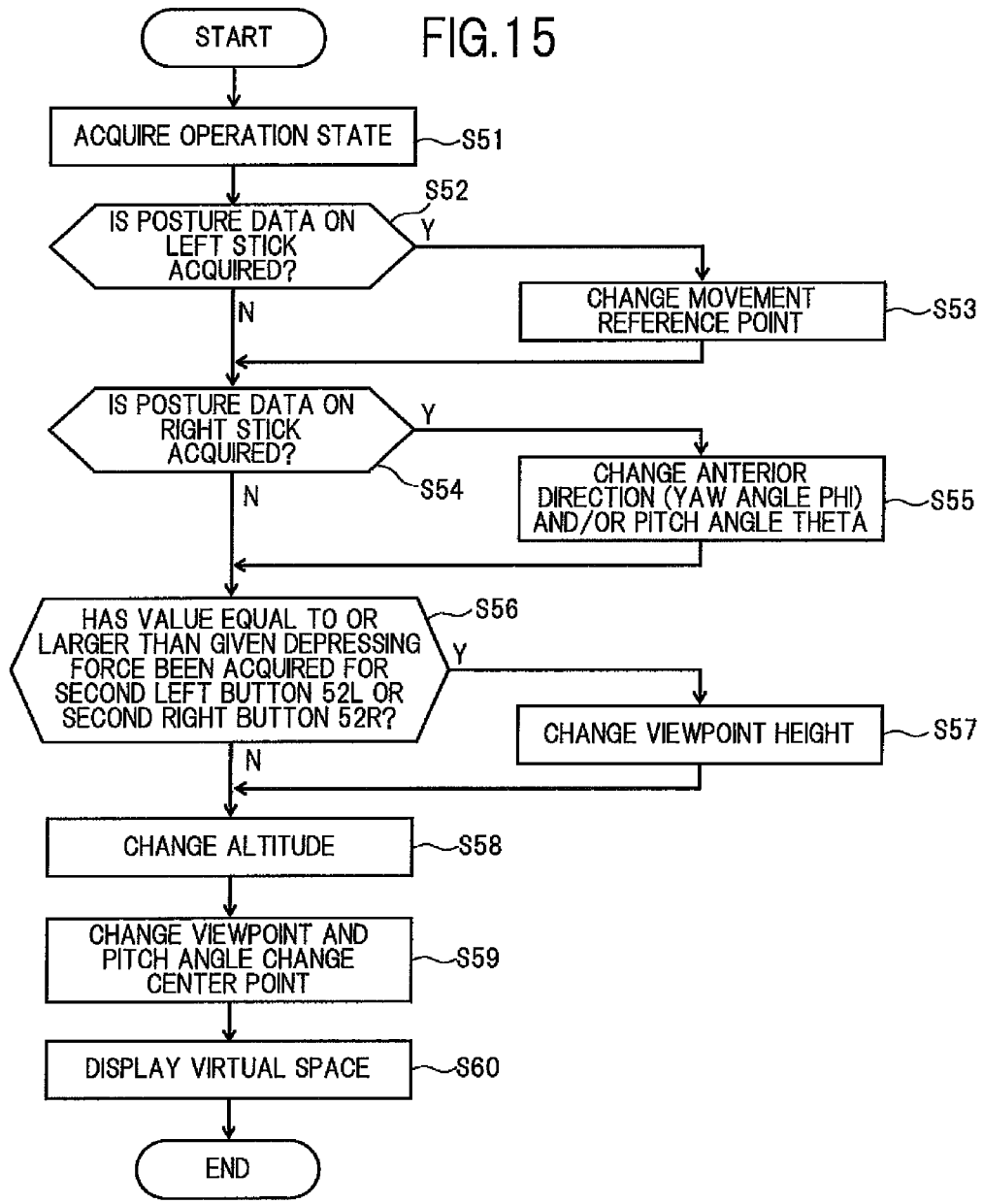

IMAGE DISPLAY DEVICE, METHOD FOR CONTROLLING IMAGE DISPLAY DEVICE, AND INFORMATION STORAGE MEDIUM

TECHNICAL FIELD

The present invention relates to an image display device, a method for controlling an image display device, and an information storage medium.

BACKGROUND ART

There has been known an image display device for displaying, on a screen of a monitor or the like, an image rendering a scene of a virtual space having virtual objects disposed therein, which is viewed from a viewpoint in the line of sight. Patent Literature 1, for example, discloses a technology related to an image display device capable of accurately displaying a three dimensional image of an object with ease. In the image display device as described above, the virtual objects disposed in the virtual space specifically include, for example, the Earth represented by a plurality of polygons provided with textures of aerial photographs or satellite images, and mountain chains represented by a plurality of polygons through three-dimensional modeling.

The image display device as described above allows the user to move the viewpoint in the virtual space by performing corresponding operations, so that the user can enjoy a sense of realism as if the user is looking at the Earth from the sky.
Patent Literature 1: U.S. Pat. No. 5,912,671 A

SUMMARY OF THE INVENTION

However, in the above-mentioned image display device, there has been a problem as follows. That is, when the line of sight is tilted due to user's operation to change the pitch angle of the viewpoint, an image down the line of sight, that is, an image depicting the deep side of the point of gaze, may become difficult to display on a screen of a monitor.

Further, in the above-mentioned image display device, when the viewpoint in the virtual space is moved by user's operation, the viewpoint may be controlled to be moved at a constant speed irrespective of the distance between the virtual objects and the viewpoint.

Under such circumstances, for example, in a case where the virtual object has surface irregularities as in a case where virtual objects rendering a mountain chain are disposed in the virtual space, the distance between the viewpoint and the virtual objects affects the flow of a view field, that is, the speed of scrolling the image displayed on a screen of a display apparatus such as a display, when the viewpoint is moved along the surface of the virtual space by user's operation. Specifically, for example, the view field flows slowly at a low altitude while the view field flows fast at a high altitude.

For this reason, the user may find it difficult to perform an operation of precisely moving the viewpoint, for example, in a case where the user desires to move the viewpoint to a place of interest to the user.

Further, in the above-mentioned image display device, the image of the virtual object that should be displayed on the screen may fall out completely, or for the most part, of the screen, depending on the position of the viewpoint or the line of sight (see FIG. 18). In this case, the user cannot determine the position of the viewpoint or the line of sight with respect to the current virtual object, which makes it difficult for the user to perform operation to control the position of the viewpoint and the line of sight so that the image rendering the virtual object may be brought back to be displayed on the screen again. In such a case, the display status of the image of the virtual object to be displayed on the screen may preferably be controlled so that, for example, the image rendering the virtual object may always be displayed on the screen.

The present invention has been made in view of the above-mentioned problems, and it is an object of the present invention to provide an image display device capable of easily displaying an image depicting the deep side of the point of gaze when an operation to change the pitch angle of the viewpoint is performed by the user, a method for controlling the image display device, and an information storage medium.

It is another object of the present invention to provide an image display device which allows the user to perform an operation of moving the viewpoint in the virtual space more precisely, a method for controlling the image display device, and an information storage medium.

It is a further object of the present invention to provide an image display device capable of controlling a display status of displaying an image of the virtual object to be displayed on the screen, a method for controlling the image display device, and an information storage medium.

In order to solve the above-mentioned problems, the present invention provides an image display device for displaying an image rendering a scene viewed from a viewpoint in a virtual space in a line of sight, the virtual space having at least one virtual object disposed therein, the image display device including: viewpoint moving means for performing at least one of a process of moving a position of the viewpoint and a process of changing the line of sight, according to a viewpoint moving operation performed by a user; pitch angle change center point position calculation means for calculating a position of a pitch angle change center point which exists on a straight line extending from the viewpoint in the line of sight; and pitch angle change means for changing a pitch angle of the viewpoint about the pitch angle change center point according to a pitch angle change operation performed by the user, and changing the line of sight so that the line of sight is directed to the pitch angle change center point from the position of the viewpoint with the pitch angle thus changed.

The present invention also provides a method for controlling an image display device for displaying an image rendering a scene viewed from a viewpoint in a virtual space in a line of sight, the virtual space having at least one virtual object disposed therein, the method for controlling an image display device including: a viewpoint moving step of performing at least one of a process of moving a position of the viewpoint and a process of changing the line of sight, according to a viewpoint moving operation performed by a user; a pitch angle change center point position calculation step of calculating a position of a pitch angle change center point which exists on a straight line extending from the viewpoint in the line of sight; and a pitch angle change step of changing a pitch angle of the viewpoint about the pitch angle change center point according to a pitch angle change operation performed by the user, and changing the line of sight so that the line of sight is directed to the pitch angle change center point from the position of the viewpoint with the pitch angle thus changed.

The present invention also provides a computer-readable information storage medium storing a program for controlling a computer to function as an image display device for displaying an image rendering a scene viewed from a viewpoint in a virtual space in a line of sight, the virtual space having at least one virtual object disposed therein, the computer-readable information storage medium storing the program for controlling the computer to function as: viewpoint moving means for performing at least one of a process of moving a position of the viewpoint and a process of changing the line of sight, according to a viewpoint moving operation performed by a user; pitch angle change center point position calculation means for calculating a position of a pitch angle change center point which exists on a straight line extending from the viewpoint in the line of sight; and pitch angle change means for changing a pitch angle of the viewpoint about the pitch angle change center point according to a pitch angle change operation performed by the user, and changing the line of sight so that the line of sight is directed to the pitch angle change center point from the position of the viewpoint with the pitch angle thus changed.

According to the present invention, the pitch angle of the viewpoint may be changed about the pitch angle change center point, and hence an image depicting the deep side of the point of gaze may be displayed with ease when the pitch angle change operation is performed by the user.

According to an aspect of the present invention, the pitch angle change center point position calculation means calculates, as the position of the pitch angle change center point, a position of a point which internally divides a distance between a position indicating a point of gaze and the position of the viewpoint at a given ratio. With this configuration, the position of the pitch angle change center point may be calculated with ease.

Further, according to another aspect of the present invention, the image display device further includes pitch angle change center point moving means for moving a position of the pitch angle change center point according to a pitch angle change center point moving operation performed by the user, and changing at least the line of sight so that the line of sight is directed to the pitch angle change center point from the position of the viewpoint. With this configuration, the user may be allowed to move the position of the pitch angle change center point in a state where the line of sight is directed to the pitch angle change center point.

Further, according to a further aspect of the present invention, the virtual object renders the Earth.

The present invention also provides another image display device for displaying an image rendering a scene depicting a view field region which is defined based on a viewpoint and a line of sight in a virtual space having a virtual object disposed therein, the image display device including: viewpoint movement speed determination means for determining a movement speed of the viewpoint, based on a virtual object-to-viewpoint distance which is a distance based on a relation between a position indicating the virtual object included in the view field region and a position indicating the viewpoint, according to a viewpoint moving operation performed by a user; and viewpoint moving means for moving the position of the viewpoint at the movement speed determined by the viewpoint movement speed determination means.

The present invention also provides another method for controlling an image display device for displaying an image rendering a scene depicting a view field region viewed from a viewpoint in a virtual space having a virtual object disposed therein, the method for controlling an image display device including: a viewpoint movement speed determination step of determining a movement speed of the viewpoint, based on a virtual object-to-viewpoint distance which is a distance based on a relation between a position indicating the virtual object included in the view field region and a position indicating the viewpoint, according to a viewpoint moving operation performed by a user; and a viewpoint moving step of moving the position of the viewpoint at the movement speed determined in the viewpoint movement speed determination step.

The present invention also provides another computer-readable information storage medium storing a program for controlling a computer to function as an image display device for displaying an image rendering a scene depicting a view field region viewed from a viewpoint in a virtual space having a virtual object disposed therein, the computer-readable information storage medium storing the program for controlling the computer to function as: viewpoint movement speed determination means for determining a movement speed of the viewpoint, based on a virtual object-to-viewpoint distance which is a distance based on a relation between a position indicating the virtual object included in the view field region and a position indicating the viewpoint, according to a viewpoint moving operation performed by a user; and viewpoint moving means for moving the position of the viewpoint at the movement speed determined by the viewpoint movement speed determination means.

According to the present invention, the position of the viewpoint moves at the movement speed according to the virtual object-to-viewpoint distance, and hence the user may be allowed to perform the operation of moving the viewpoint in the virtual space more precisely.

According to an aspect of the present invention, the viewpoint movement speed determination means determines the movement speed so that the movement speed increases in value as the virtual object-to-viewpoint distance increases in value. With this configuration, the view field flows at a lower speed as the distance between the virtual object and the viewpoint becomes smaller, and hence the user may be allowed to perform the operation of moving the viewpoint more precisely.

Further, according to another aspect of the present invention, the image display device further includes viewpoint position modification means for measuring, when the viewpoint moving means moves the viewpoint, a distance between the position indicating the viewpoint and the position indicating the virtual object, and modifying, in a case where the distance is smaller than a given distance, the position of the viewpoint in a direction away from the virtual object. With this configuration, when the viewpoint almost comes into contact with the virtual object, the viewpoint may be moved so as to avert the contact.

Further, according to a further aspect of the present invention, the image display device further includes: pitch angle change means for changing, from a current position of the viewpoint, the pitch angle about a pitch angle change center point which exists on a straight line extending from the viewpoint in the line of sight, according to a pitch angle change operation performed by the user, and changing the line of sight so that the line of sight is directed to the pitch angle change center point from the position of the viewpoint with the pitch angle thus changed; and pitch angle change center point position modification means for measuring, when the viewpoint moving means moves the viewpoint, a distance between a position indicating the pitch angle change center point and the position indicating the virtual object, and modifying, in a case where the distance exceeds a given range, the position of the pitch angle change center point so that the distance falls within the given range. With this configuration, the user may be allowed to perform an operation of changing the pitch angle of the viewpoint, and hence the distance between the pitch angle change center point and the virtual object may be made to fall within the given range.

Further, according to a still further aspect of the present invention, the virtual object renders the Earth.

The present invention also provides a further image display device for displaying an image rendering a scene depicting a view field region determined based on a viewpoint and a line of sight in a virtual space having a virtual object disposed therein, the image display device including: allowable range calculation means for calculating an allowable range for moving a position of the viewpoint and/or an allowable range for changing the line of sight, based on a size of a region where the view field region overlaps with a closed region occupied by the virtual object; and viewpoint moving means for performing a process of moving the position of the viewpoint and/or a process of changing the line of sight within the allowable range, according to a viewpoint moving operation performed by a user.

The present invention also provides a further method for controlling an image display device for displaying an image rendering a scene depicting a view field region which is defined based on a viewpoint and a line of sight in a virtual space having a virtual object disposed therein, the method for controlling an image display device including: an allowable range calculation step of calculating an allowable range for moving a position of the viewpoint and/or an allowable range for changing the line of sight, based on a size of a region where the view field region overlaps with a closed region occupied by the virtual object; and a viewpoint moving step of performing a process of moving the position of the viewpoint and/or a process of changing the line of sight within the allowable range, according to a viewpoint moving operation performed by a user.

The present invention also provides a further computer-readable information storage medium storing a program for controlling a computer to function as an image display device for displaying an image rendering a scene depicting a view field region which is defined based on a viewpoint and a line of sight in a virtual space having a virtual object disposed therein, the computer-readable information storage medium storing the program for controlling the computer to function as: allowable range calculation means for calculating an allowable range for moving a position of the viewpoint and/or an allowable range for changing the line of sight, based on a size of a region where the view field region overlaps with a closed region occupied by the virtual object; and viewpoint moving means for performing a process of moving the position of the viewpoint and/or a process of changing the line of sight within the allowable range, according to a viewpoint moving operation performed by a user.

According to the present invention, the viewpoint may be moved within the calculated allowable range or the line of sight may be changed within the allowable range, depending on how the view field region overlaps with the closed region occupied by the virtual object, and hence the display status of the image of the virtual object to be displayed on a screen may be controlled.

Further, according to one aspect of the present invention, the allowable range calculation means calculates the position of the viewpoint and/or the line of sight when the line of sight is equivalent to a tangent line direction with respect to the closed region, as a boundary between an inside and an outside of the allowable range. With this configuration, the display status of the image of the virtual object to be displayed on a screen of a monitor may be controlled so that a contour of the virtual object may be displayed in the center of the screen.

Further, according to another aspect of the present invention, the image display device further includes pitch angle change means for changing, from a current position of the viewpoint, the pitch angle about a pitch angle change center point which exists on a straight line extending from the viewpoint in the line of sight, according to a pitch angle change operation performed by the user, and changing the line of sight so that the line of sight is directed to the pitch angle change center point from the position of the viewpoint with the pitch angle thus changed, and the allowable range calculation means calculates the position of the viewpoint and/or the line of sight when a straight line passing through the pitch angle change center point and the viewpoint extends in a direction equivalent to a tangent line direction with respect to the closed region, as a boundary between an inside and an outside of the allowable range. With this configuration, the user may be allowed to perform the pitch angle change operation. Further, the boundary of the outside and the inside of the allowable range may be calculated based on the straight line passing through the pitch angle change center point and the viewpoint, and hence the allowable range may be calculated with more ease.

Further, according to a further aspect of the present invention, the allowable range calculation means calculates a pitch angle range, and the pitch angle change means changes the pitch angle within the pitch angle range calculated by the allowable range calculation means. With this configuration, the allowable range may be controlled based on the pitch angle, and hence the allowable range may be controlled with more ease.

Further, in the further aspect, the image display device may further include: relative pitch angle data storage means for storing relative pitch angle data representing a ratio of an angle formed by the straight line passing through the pitch angle change center point and the viewpoint, and, a straight line passing through the pitch angle change center point and being perpendicular to a region rendering the virtual object, with respect to a maximum pitch angle which is a maximum value in the pitch angle range calculated by the allowable range calculation means; relative pitch angle data change means for changing the relative pitch angle data stored in the relative pitch angle data storage means, according to a relative pitch angle change operation performed by the user; and pitch angle calculation means for calculating the pitch angle, based on the ratio with respect to the maximum pitch angle represented by the relative pitch angle data and the maximum pitch angle, and the pitch angle change means may change the pitch angle, based on the pitch angle calculated by the pitch angle calculation means and a position of the pitch angle change center point. With this configuration, the position of the viewpoint may be managed based on the relative pitch angle.

Further, according to a still further aspect of the present invention, the virtual object renders the Earth.

BRIEF DESCRIPTION OF THE DRAWINGS

FIG. 1 is a hardware configuration diagram illustrating an example of a hardware configuration of an entertainment system employed as an image display device according to an embodiment of the present invention.

FIG. 2 is a detailed configuration diagram illustrating in detail an example of a micro processing unit (MPU).

FIG. 4C is a diagram illustrating an example of a further scene viewed from a viewpoint in a line of sight in the virtual space.

FIG. 15 is a flow chart illustrating an example of a flow of processing performed in an entertainment system according to another embodiment of the present invention.

FIG. 16 illustrates another example of the data structure of the viewpoint data.

DETAILED DESCRIPTION OF THE PREFERRED EMBODIMENTS

Figure 3A:
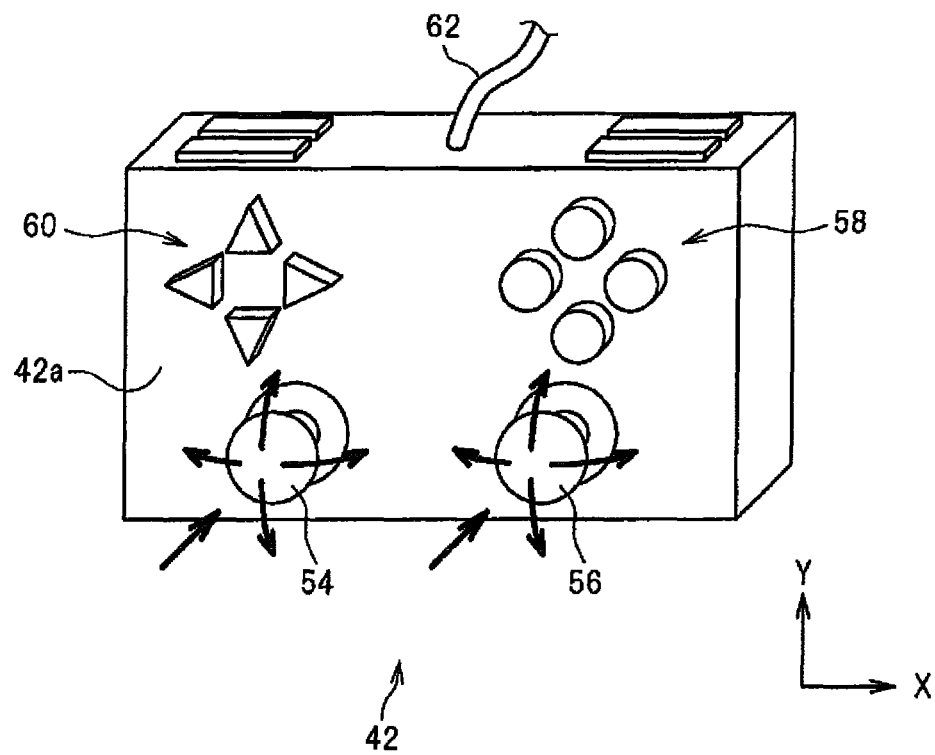
FIG. 3A is a perspective view illustrating an example of a controller.

In the following, an embodiment of the present invention is described in detail with reference to the accompanying drawings.

FIG. 1 is a diagram illustrating a hardware configuration of an entertainment system (image display device) according to this embodiment of the present invention. As illustrated in FIG. 1, the entertainment system 10 is a computer system which includes a micro processing unit (MPU) 11, a main memory 20, an image processing unit 24, a monitor 26, an input-output processing unit 28, a sound processing unit 30, a speaker 32, an optical disc reading unit 34, an optical disc 36, a hard disk 38, interfaces (I/F) 40 and 44, a controller 42, a camera unit 46, and a network interface 48.

FIG. 2 is a diagram illustrating a configuration of the MPU 11. As illustrated in FIG. 2, the MPU 11 includes a main processor 12, sub-processors 14a, 14b, 14c, 14d, 14e, 14f, 14g, and 14h, a bus 16, a memory controller 18, and an interface (I/F) 22.

The main processor 12 carries out various kinds of information processing and performs control on the sub-processors 14a to 14h, based on an operating system stored in a read only memory (ROM) (not shown), a program and data read out from the optical disc 36 such as a digital versatile disk (DVD)-ROM, a program and data supplied via a communication network, and the like.

The sub-processors 14a to 14h carry out various kinds of information processing according to an instruction from the main processor 12, and perform control on the respective units of the entertainment system 10, based on a program and data read out from the optical disc 36 such as a DVD-ROM, a program and data supplied via a communication network, and the like.

The bus 16 is used for exchanging an address and data among the respective units of the entertainment system 10. The main processor 12, the sub-processors 14a to 14h, the memory controller 18, and the interface 22 are mutually connected via the bus 16, so that data may be exchanged therebetween.

The memory controller 18 accesses the main memory 20 according to an instruction from the main processor 12 and the sub-processors 14a to 14h. A program and data read out from the optical disc 36 or the hard disk 38 and a program and data supplied via a communication network are written into the main memory 20 as appropriate. The main memory 20 is also used as a working memory of the main processor 12 and the sub-processors 14a to 14h.

The image processing unit 24 and the input-output processing unit 28 are connected to the interface 22. The main processor 12 and the sub-processors 14a to 14h exchange data with the image processing unit 24 or with the input-output processing unit 28 via the interface 22.

The image processing unit 24 includes a graphical processing unit (GPU) and a frame buffer. The GPU renders various screens on the frame buffer, based on image data supplied from the main processor 12 or the sub-processors 14a to 14h. The screens formed on the frame buffer are converted into a video signal at a predetermined timing, and output to the monitor 26. It should be noted that the monitor 26 may be implemented as, for example, a home-use television receiver.

The input-output processing unit 28 is connected to the sound processing unit 30, the optical disc reading unit 34, the hard disk 38, and the interfaces 40 and 44. The input-output processing unit 28 controls the main processor 12 and the sub-processors 14a to 14h to exchange data with the sound processing unit 30, the optical disc reading unit 34, the hard disk 38, the interfaces 40 and 44, and the network interface 48.

The sound processing unit 30 includes a sound processing unit (SPU) and a sound buffer. The sound buffer stores various kinds of sound data, such as game music, game sound effects, a message, and the like, which are read out from the optical disc 36 or the hard disk 38. The SPU reproduces the various kinds of sound data and outputs the reproduced data from the speaker 32. It should be noted that the speaker 32 may be implemented as, for example, a built-in speaker of a home-use television receiver.

The optical disc reading unit 34 reads a program and data stored in the optical disc 36, according to an instruction from the main processor 12 and the sub-processors 14a to 14h. It should be noted that the entertainment system 10 may be configured to be able to read a program and data stored in any computer-readable information storage medium other than the optical disc 36.

The optical disc 36 includes a general optical disc (computer-readable information storage medium), such as a DVD-ROM. The hard disk 38 is also a general hard disk device. The optical disc 36 and the hard disk 38 store various kinds of programs and data in a computer-readable manner.

The interfaces (I/F) 40 and 44 are used for connecting various peripheral devices, such as the controller 42 and the camera unit 46. Such an interface may be implemented as, for example, a universal serial bus (USB) interface.

The controller 42 serves as general-purpose operation input means for use by a user to input various kinds of operations (for example, game operation). The input-output processing unit 28 scans the states of the respective units of the controller 42 at predetermined intervals (for example, every ⅟60 seconds), and supplies the result as operational states to the main processor 12 or the sub-processors 14a to 14h. The main processor 12 or the sub-processors 14a to 14h determine the contents of an operation performed by the user, based on the operational states. It should be noted that the entertainment system 10 is configured to be connectable to a plurality of controllers 42, and the main processor 12 and the sub-processors 14a to 14h carry out various kinds of processing based on the operational states input from the respective controllers 42.

The camera unit 46 includes, for example, a publicly-known digital camera, and inputs a captured image of black/white, gray-scale, or color, at predetermined intervals (for example, every ⅟60 seconds). The camera unit 46 according to this embodiment inputs the captured image as image data in the Joint Photographic Experts Group (JPEG) format. The camera unit 46 is placed on the monitor 26, in a state in which, for example, the lens thereof is directed to the user, and connected to the interface 44 via a cable. The network interface 48 is connected to the input-output processing unit 28 and a network, so as to relay data communication carried out by the entertainment system 10 via the network with another entertainment system 10.

Figure 3B:
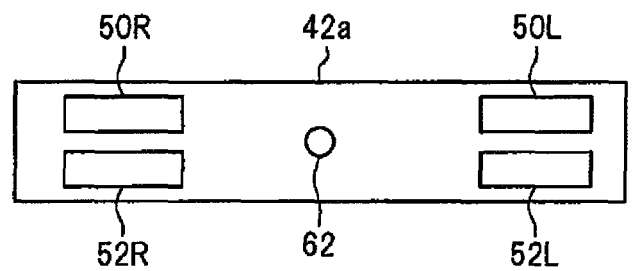
FIG. 3B is an upper side view illustrating an example of the controller.

FIG. 3A is a perspective view illustrating an example of the controller 42. FIG. 3B is an upper side view illustrating an example of the controller 42. As illustrated in FIG. 3A, the controller 42 is connected to the entertainment system 10 via a controller cable 62, and is provided with a direction button group 60 and a left operation stick 54 on the left side of a surface 42a, and with a button group 58 and a right operation stick 56 on the right side of the surface 42a. Further, as illustrated in FIG. 3B, on a deep side surface of the controller 42, there are provided a first left button 50L and a first right button 50R on the left and right of the surface 42a side, respectively, and a second left button 52L and a second right button 52R on the left and right of the rear surface side, respectively. When the user holds right and left portions of a casing of the controller 42 with both hands, the left thumb comes to the direction button group 60 and the left operation stick 54 and the right thumb comes to the button group 58 and the right operation stick 56. At least one of the right index finger and the right middle finger comes to the first right button 50R or the second right button 52R, and at least one of the left index finger and the left middle finger comes to the first left button 50L or the second left button 52L.

The direction button group 60, the button group 58, the first left button 50L, the first right button 50R, the second left button 52L, the second right button 52R are each formed of a pressure-sensitive button, which is provided with a pressure sensor. When the user depresses those buttons, a digital value of one of 256 levels on a scale of 0 to 255 is input to the entertainment system 10 according to the depressing force. Specifically, in the entertainment system 10, the digital value is used to determine that, for example, when a digital value of 0 is input from the controller 42, the corresponding button is not depressed, whereas when a digital value of 255 is input, the corresponding button is depressed with a maximum depressing force.

The left operation stick 54 and the right operation stick 56 are each an operating member shaped like a stick, which stand upright on a surface of the casing of the controller 42, and are capable of being tilted in all directions at a predetermined angle from the upright state. As illustrated in FIG. 3A, the longitudinal direction of the casing of the controller 42 is defined as an X-axis direction (rightward direction in FIG. 3A is set as a positive direction), and the depth direction of the casing, the direction being orthogonal to the X-axis direction, is defined as a Y-axis direction (direction extending from the front to the back in FIG. 3A is set as a positive direction). The posture (operating state) of the left operation stick 54 is represented by tilts in the X-axis direction and the Y-axis direction (posture data (X, Y)), and the tilts are each input as a digital value on a scale of 0 to 255 to the entertainment system 10. Specifically, when X has a value equal to or close to 127 and 128, it is indicated that the left operation stick 54 is not tilted in the X-axis direction. Alternatively, when X=255, it is indicated that the left operation stick 54 is tilted to the maximum in the positive direction of the X-axis (rightward direction in FIG. 3A). Further, when X=0, it is indicated that the left operation stick 54 is tilted to the maximum in the negative direction of the X-axis (leftward direction in FIG. 3A). The same applies to the Y-axis direction. Further, the right operation stick 56 may be operated similarly as in the case of the left operation stick 54. In this manner, the entertainment system 10 is capable of identifying a current state (posture) of tilt of each of the left operation stick 54 and the right operation stick 56. Further, the left operation stick 54 and the right operation stick 56 are each also formed of a pressure-sensitive button similar to those forming the direction button group 60, the button group 58, and the like, and may be depressed in the shaft direction of the stick.

Further, the controller 42 includes an embedded oscillator (vibrator). The vibrator vibrates by order of the MPU 11.

In the following, a description is given of the embodiment of the present invention in which the entertainment system 10 with the above-mentioned hardware configuration is implemented as an image display device.

Figure 4A:
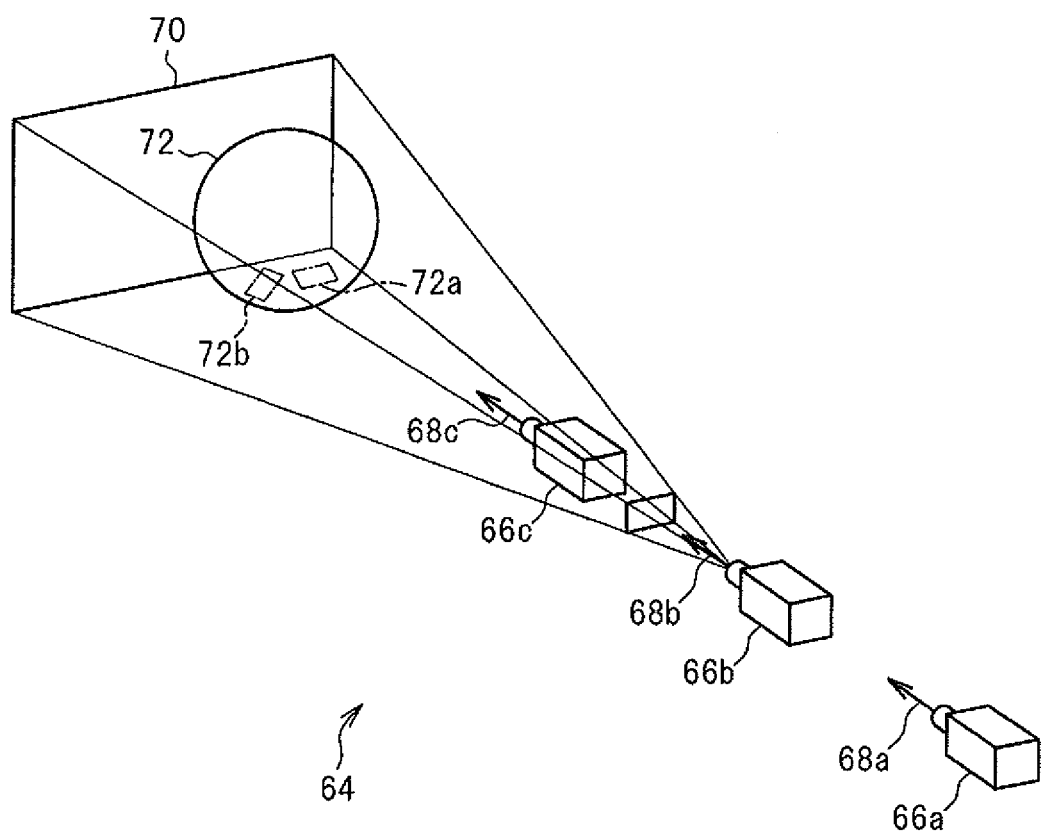
FIG. 4A is a diagram illustrating an example of a scene viewed from a viewpoint in a line of sight in a virtual space.
Figure 4B:
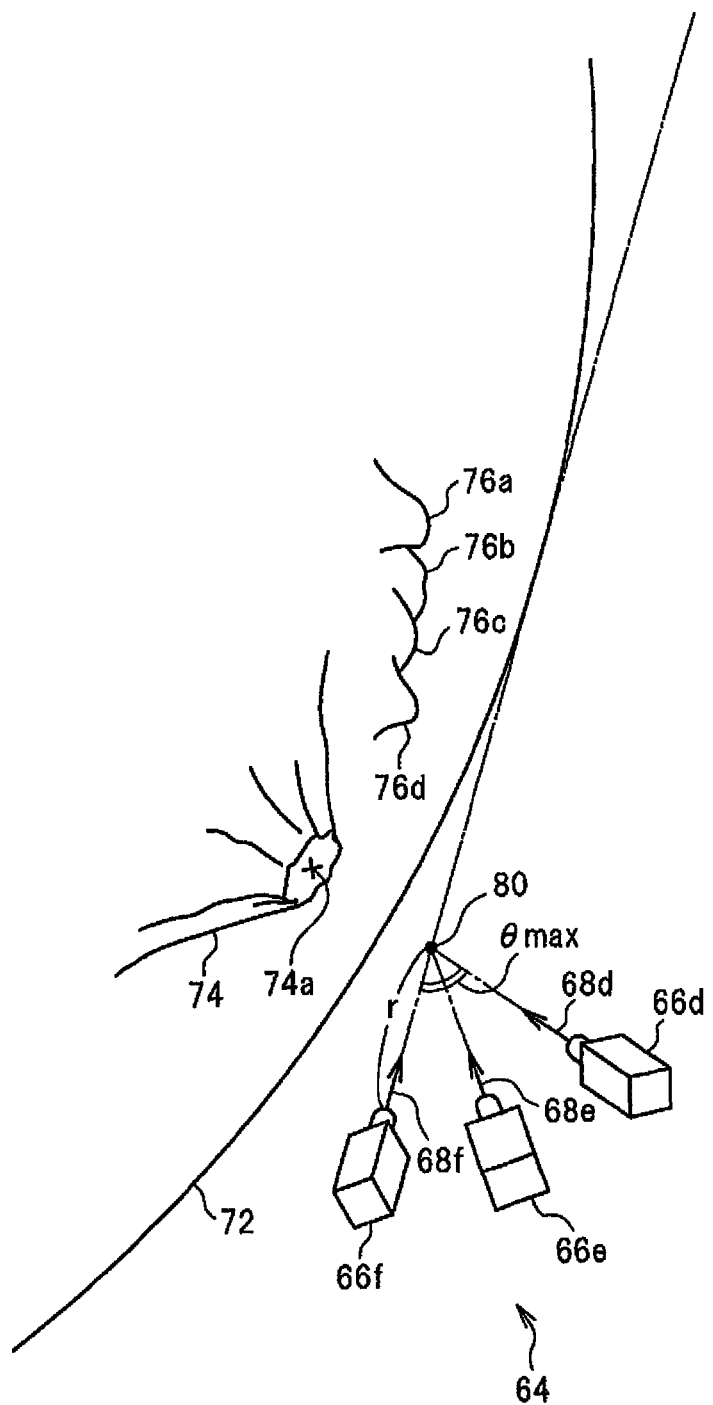
FIG. 4B is a diagram illustrating an example of another scene viewed from a viewpoint in a line of sight in the virtual space.

First, an outline of this embodiment is described. In this embodiment, the entertainment system 10 displays, on a screen of the monitor 26, an image rendering a scene viewed from a viewpoint 66 (66a to 66j) in a line of sight 68 (68a to 68j) in a virtual space 64 having at least one virtual object disposed therein (scene depicting a view field region 70 which is defined based on a position of the viewpoint 66 and the line of sight 68), as illustrated in FIGS. 4A to 4C. In this embodiment, in an initial state, an image rendering a scene viewed from the viewpoint 66a in the line of sight 68a is displayed on the screen of the monitor 26. Then, a user of the entertainment system 10 operates the controller 42, to thereby freely move the position of the viewpoint 66 and the line of sight 68.

In this embodiment, as illustrated in FIG. 4A, a virtual object (virtual Earth object 72) depicting the Earth (Earth's surface) is disposed in the virtual space 64. FIG. 4B illustrates a first region 72a, which is a part of the Earth's surface rendered on the virtual Earth object 72 illustrated in FIG. 4A, and FIG. 4C illustrates a second region 72b, which is another part of the Earth's surface rendered on the virtual Earth object 72 illustrated in FIG. 4A. As illustrated in FIGS. 4A to 4C, a mountain 74, hills 76 (76a to 76n), and a cliff 78 are rendered three-dimensionally on a surface of the virtual Earth object 72.

Figure 5A:
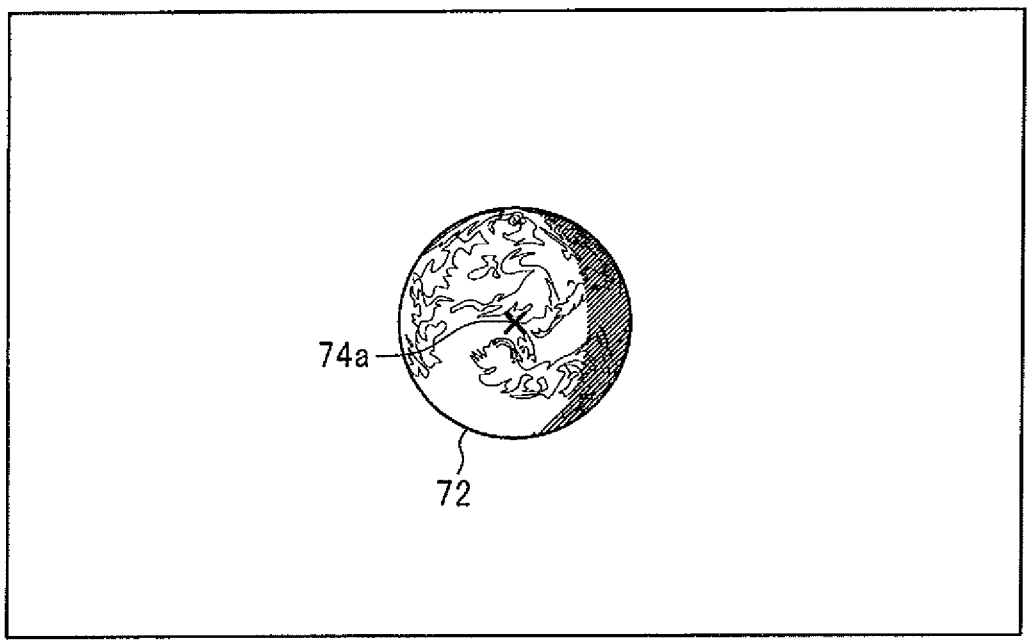
FIG. 5A illustrates an example of an image rendering a scene viewed from a viewpoint in a line of sight in the virtual space.

FIG. 5A illustrates an example of an image to be displayed on the screen of the monitor 26. The image renders a scene viewed from the viewpoint 66a in the line of sight 68a. As illustrated in FIG. 5A, in this embodiment, an image rendering the virtual Earth object 72 is shaded in part on the right side, indicating that sunlight does not reach the shaded part. The virtual Earth object 72 as a whole has clouds rendered in scenery viewed from a meteorological satellite.

Figure 5B:
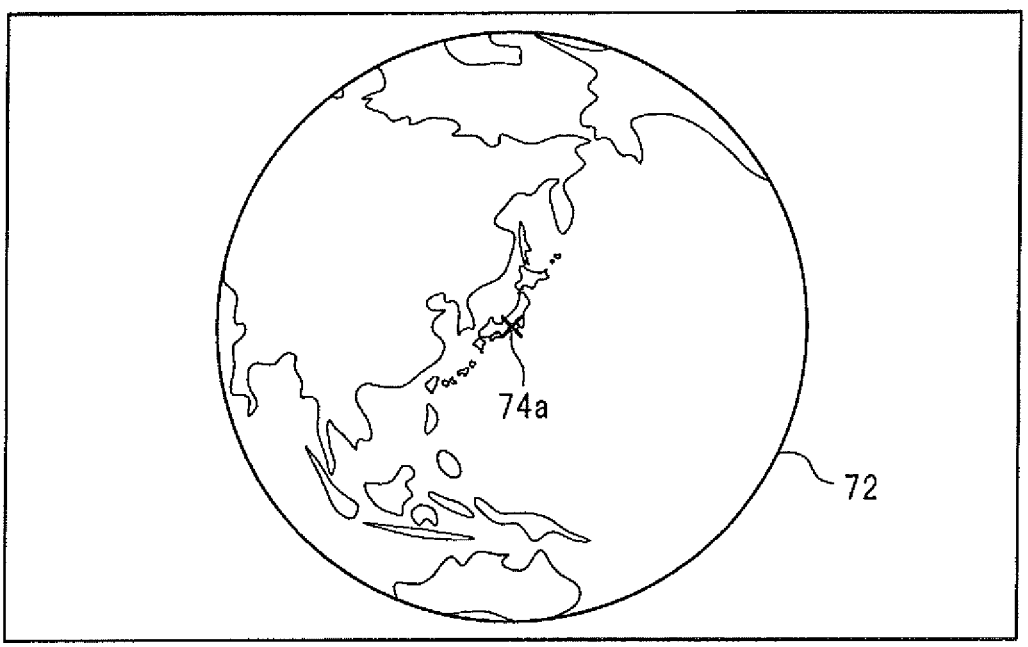
FIG. 5B illustrates an example of another image rendering a scene viewed from a viewpoint in a line of sight in the virtual space.

FIG. 5B illustrates an example of another image to be displayed on the screen of the monitor 26. The image renders a scene viewed from the viewpoint 66b in the line of sight 68b. As illustrated in FIG. 5B, the user of the entertainment system 10 operates the controller 42, so that the position of the viewpoint 66 is brought closer to the virtual Earth object 72. In the process of changing the position of the viewpoint 66, the image rendering the virtual Earth object 72 is updated to an image illustrating a map centered on Japan. Then, in this embodiment, a vibrator provided to the controller 42 vibrates when the image having clouds rendered in scenery viewed from a meteorological satellite is updated to the image illustrating a map centered on Japan.

Figure 5C:
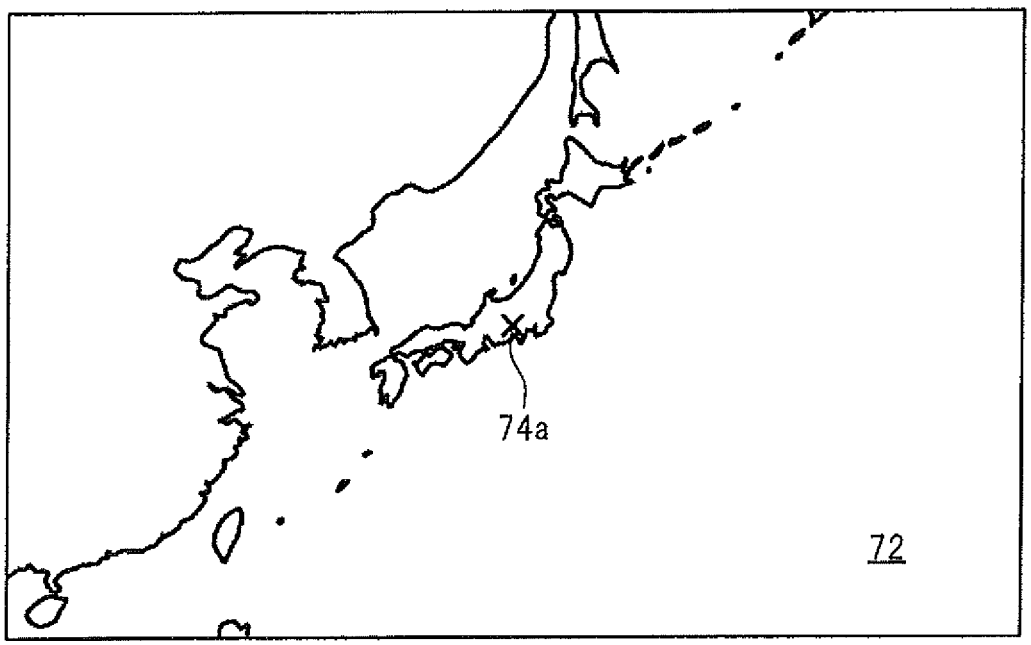
FIG. 5C illustrates an example of a further image rendering a scene viewed from a viewpoint in a line of sight in the virtual space.

FIG. 5C illustrates an example of a further image to be displayed on the screen of the monitor 26. The image renders a scene viewed from the viewpoint 66c in the line of sight 68c. As illustrated in FIG. 5C, the user of the entertainment system 10 operates the controller 42, so that the position of the viewpoint 66 is brought still closer to the virtual Earth object 72. In the process of changing the position of the viewpoint 66, the image rendering the virtual Earth object 72 is updated to an image with higher resolution. Further, in this embodiment, the viewpoint 66 moves at a lower speed as the viewpoint 66 comes closer to the virtual Earth object 72. In other words, as the position of the viewpoint 66 moves from the viewpoint 66a to the viewpoint 66c, the movement speed of the viewpoint 66 is slowed down.

Figure 5D:
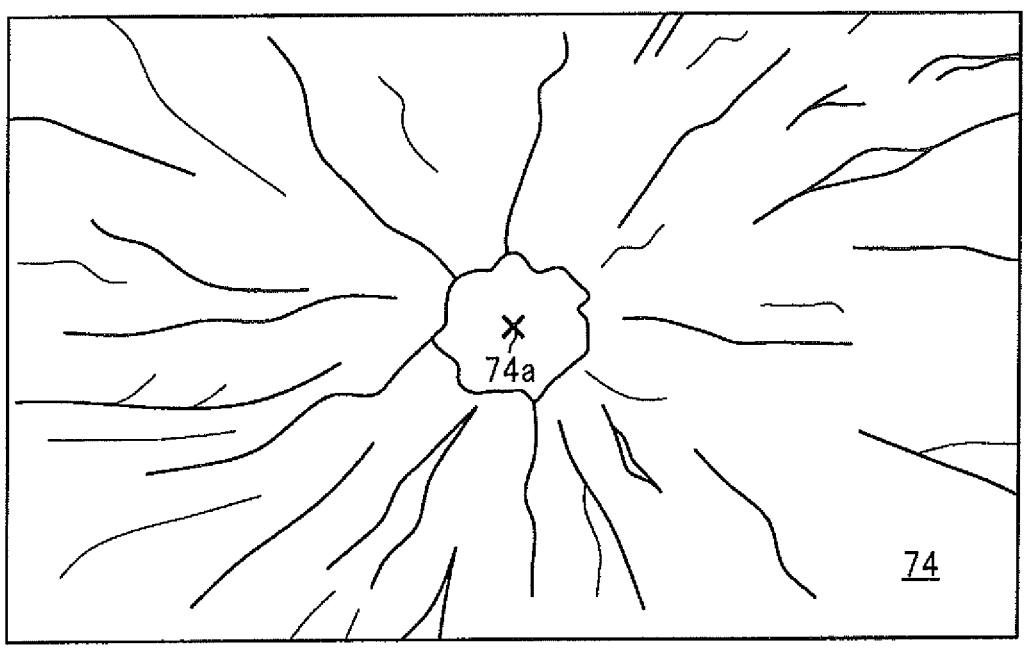
FIG. 5D illustrates an example of a still further image rendering a scene viewed from a viewpoint in a line of sight in the virtual space.

FIG. 5D illustrates an example of a still further image to be displayed on the screen of the monitor 26. The image renders a scene viewed from the viewpoint 66d in the line of sight 68d. As illustrated in FIG. 5D, the user of the entertainment system 10 operates the controller 42, so that the position of the viewpoint 66 is brought further closer to the virtual Earth object 72, and an image illustrating the mountain 74 depicted three-dimensionally on the Earth's surface of the virtual Earth object 72 is displayed on the screen of the monitor 26.

Figure 5E:
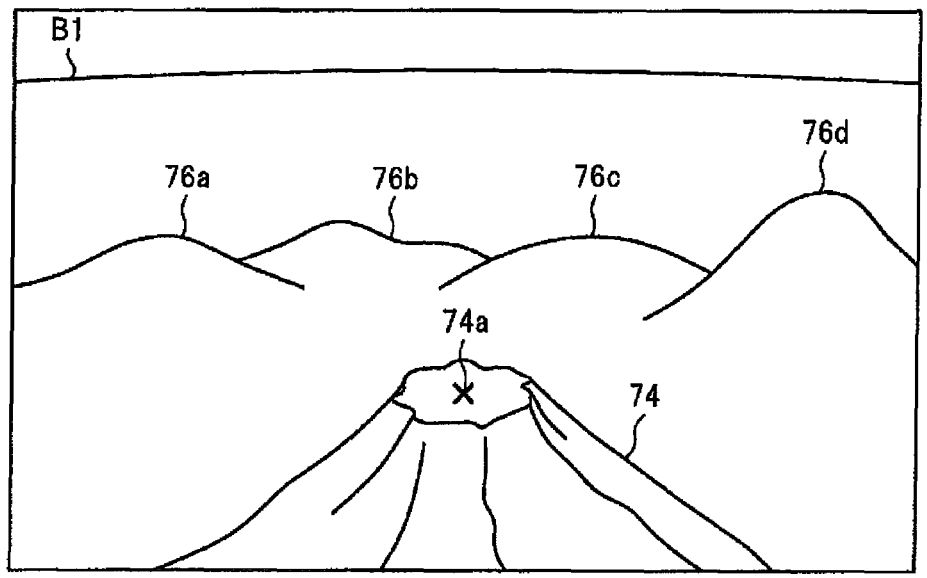
FIG. 5E illustrates an example of a yet further image rendering a scene viewed from a viewpoint in a line of sight in the virtual space.

FIG. 5E illustrates an example of a yet further image to be displayed on the screen of the monitor 26. The image renders a scene viewed from the viewpoint 66e in the line of sight 68e. As illustrated in FIG. 5E, the user of the entertainment system 10 operates the controller 42, so that a pitch angle theta is changed about a pitch angle change center point 80 (see FIG. 4B). Here, the pitch angle theta is an angle formed between two straight lines. One of the straight lines passes through the pitch angle change center point 80 and the viewpoint 66. The other one of the straight lines is perpendicular to a region indicating the virtual object (virtual Earth object 72 in this embodiment) and also passes through the pitch angle change center point 80. Here, a distance between the pitch angle change center point 80 and the viewpoint 66 is referred to as pitch angle change radius r. At this time, the monitor 26 displays, on an upper side of the screen, an image depicting a contour, that is, a horizon B1, of the virtual Earth object 72. It should be noted that the pitch angle change center point 80 is described later in detail.

Figure 5F:
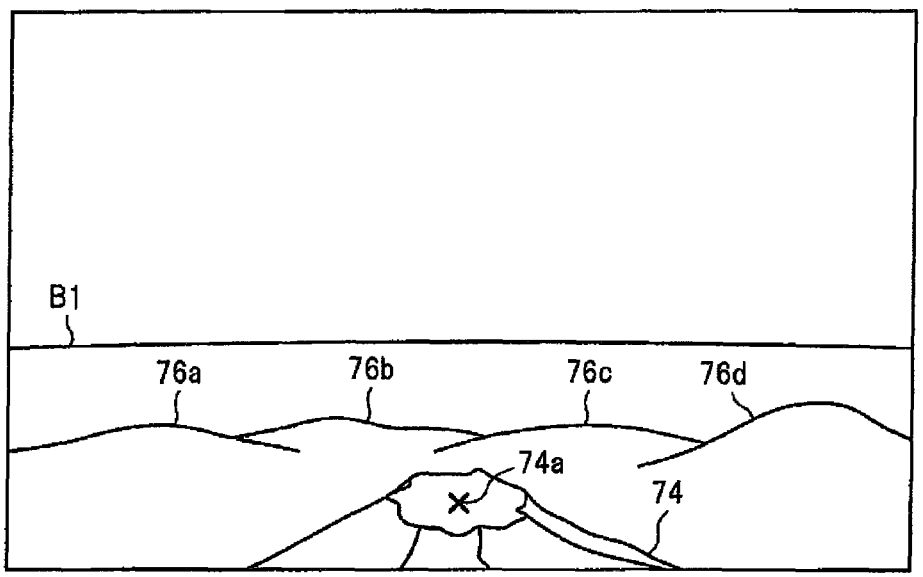
FIG. 5F illustrates an example of a yet further image rendering a scene viewed from a viewpoint in a line of sight in the virtual space.

FIG. 5F illustrates an example of a yet further image to be displayed on the screen of the monitor 26. The image renders a scene viewed from the viewpoint 66f in the line of sight 68f. As illustrated in FIG. 5F, the user of the entertainment system 10 operates the controller 42, so that a pitch angle theta is further changed about the pitch angle change center point 80. At this time, the monitor 26 displays, near the center of the screen, the image depicting the horizon B1.

Figure 18:
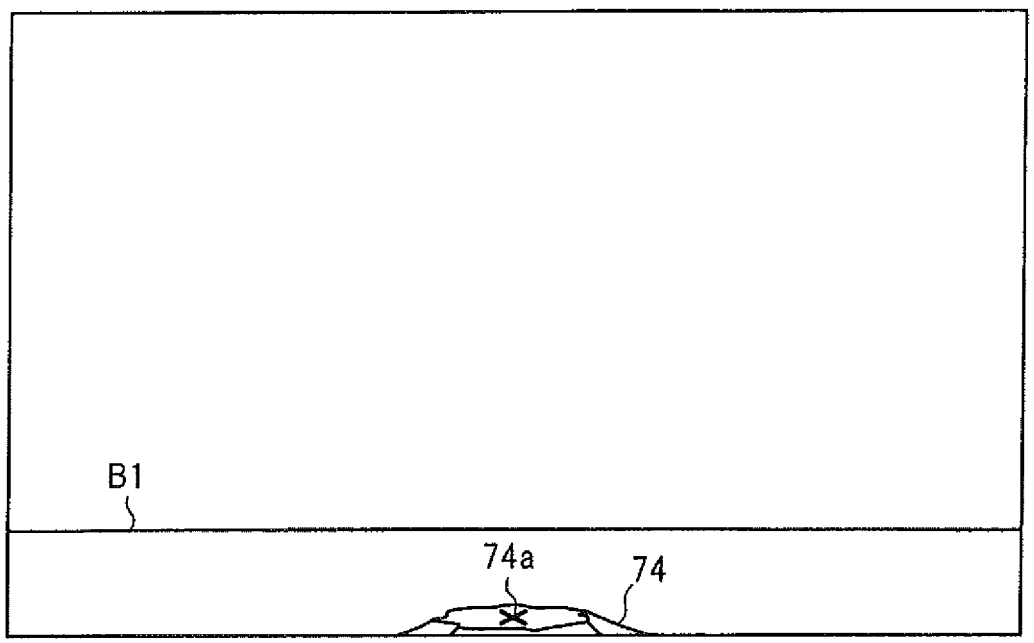
FIG. 18 illustrates an example of an image rendering a scene viewed from a viewpoint in a line of sight in a virtual space according to a related art.

In this state, if the user tries to change the pitch angle theta further about the pitch angle change center point 80, the pitch angle theta is prevented from being changed in this embodiment. In this manner, the image of the virtual Earth object 72 that should be displayed on the screen of the monitor 26 is prevented from completely falling out of the screen, or the image of the virtual Earth object 72 that should be displayed on the screen of the monitor 26 is prevented from falling out, for the most part, of the screen as illustrated in FIG. 18.

The pitch angle change center point 80 is disposed away from the surface of the virtual Earth object 72, and hence, as illustrated in FIGS. 5D to 5F, an image illustrating a top 74a of the mountain 74 is displayed at a lower position on the screen of the monitor 26 as the pitch angle theta is changed about the pitch angle change center point 80. In this manner, the user is allowed to easily view an image behind the top 74a of the mountain 74.

Figure 5G:
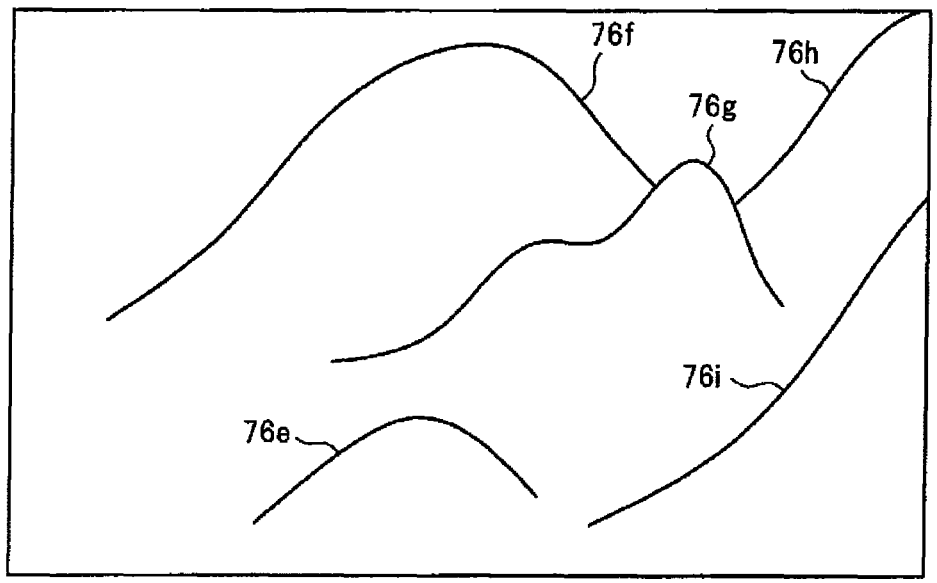
FIG. 5G illustrates an example of a yet further image rendering a scene viewed from a viewpoint in a line of sight in the virtual space.
Figure 5H:
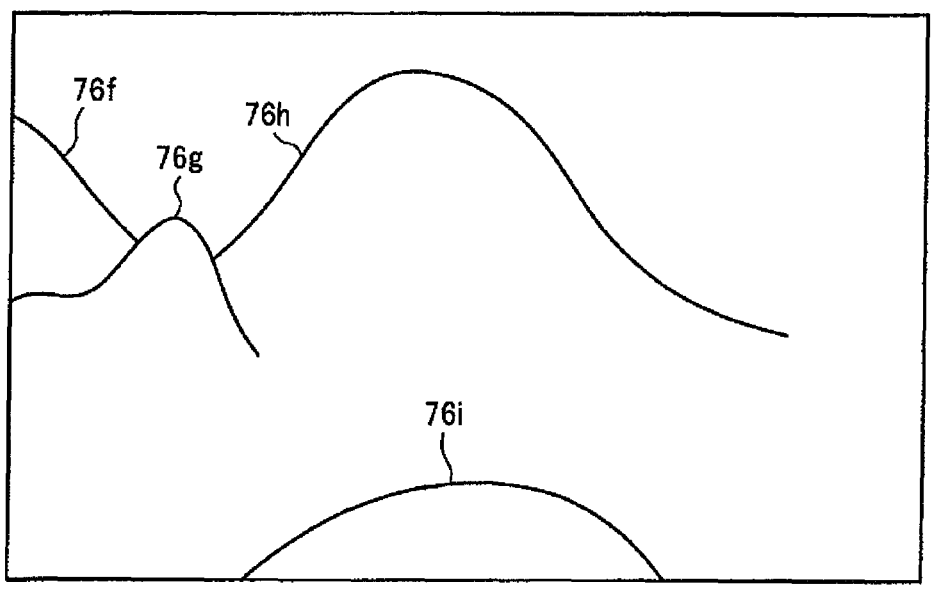
FIG. 5H illustrates an example of a yet further image rendering a scene viewed from a viewpoint in a line of sight in the virtual space.
Figure 5I:
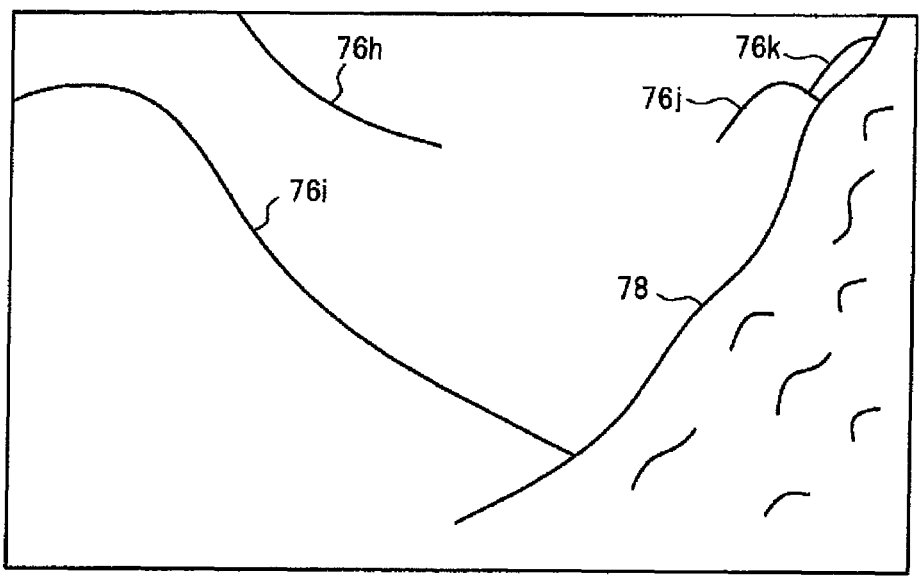
FIG. 5I illustrates an example of a yet further image rendering a scene viewed from a viewpoint in a line of sight in the virtual space.
Figure 5J:
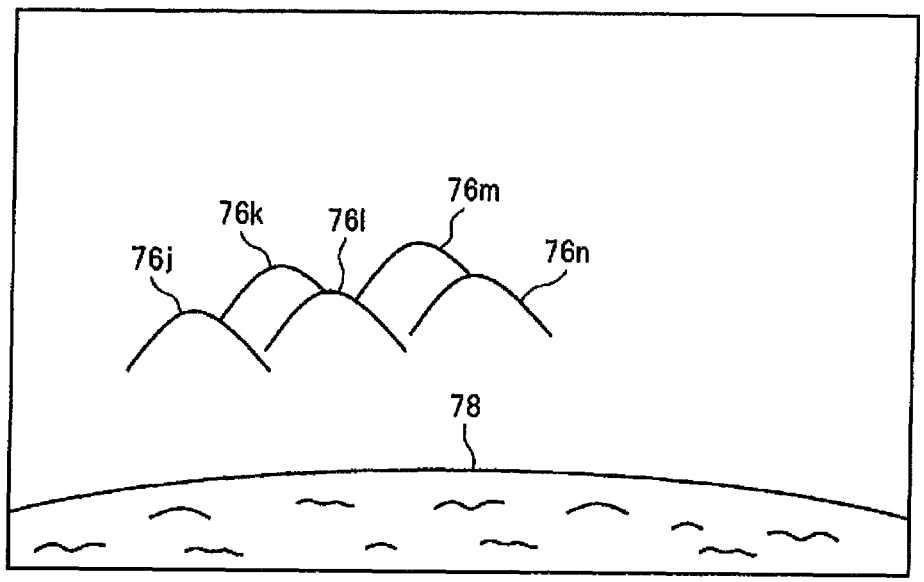
FIG. 5J illustrates an example of a yet further image rendering a scene viewed from a viewpoint in a line of sight in the virtual space.

FIG. 5G illustrates an example of a yet further image to be displayed on the screen of the monitor 26. The image renders a scene viewed from the viewpoint 66g in the line of sight 68g. FIG. 5H illustrates an example of a yet further image to be displayed on the screen of the monitor 26. The image renders a scene viewed from the viewpoint 66h in the line of sight 68h. FIG. 5I illustrates an example of a yet further image to be displayed on the screen of the monitor 26. The image renders a scene viewed from the viewpoint 66i in the line of sight 68i. FIG. 5J illustrates an example of a yet further image to be displayed on the screen of the monitor 26. The image renders a scene viewed from the viewpoint 66j in the line of sight 68j. As illustrated in FIGS. 5G to 5J, an image depicting the hills 76 is displayed on the screen of the monitor 26. At this time, the user operates the controller 42 to perform a viewpoint moving operation so that the viewpoint 66 is moved to the right along the Earth's surface of the virtual Earth object 72.

As a result, the viewpoint 66 moves from the position of the viewpoint 66g to the position of the viewpoint 66j by way of the position of the viewpoint 66h and the position of the viewpoint 66i. The viewpoint 66 is moved upward when the viewpoint 66 moves from the position of the viewpoint 66g to the position of the viewpoint 66h, while the viewpoint 66 is moved downward when the viewpoint 66 moves from the position of the viewpoint 66h to the position of the viewpoint 66i. Further, the viewpoint 66 is significantly moved upward when the viewpoint 66 is moved from the position of the viewpoint 66i to the position of the viewpoint 66j. In the manner as described above, the user of the entertainment system 10 may enjoy sensations as if the user is moving along the Earth's surface of the virtual Earth object 72.

Next, a function to be implemented by the entertainment system 10 according to this embodiment is described with reference to FIG. 6, which is a functional block diagram, and FIG. 7, which is an explanatory diagram illustrating an example of a relation of the virtual Earth object 72 with respect to the position of the viewpoint 66 and the line of sight 68, according to this embodiment.

Figure 6:
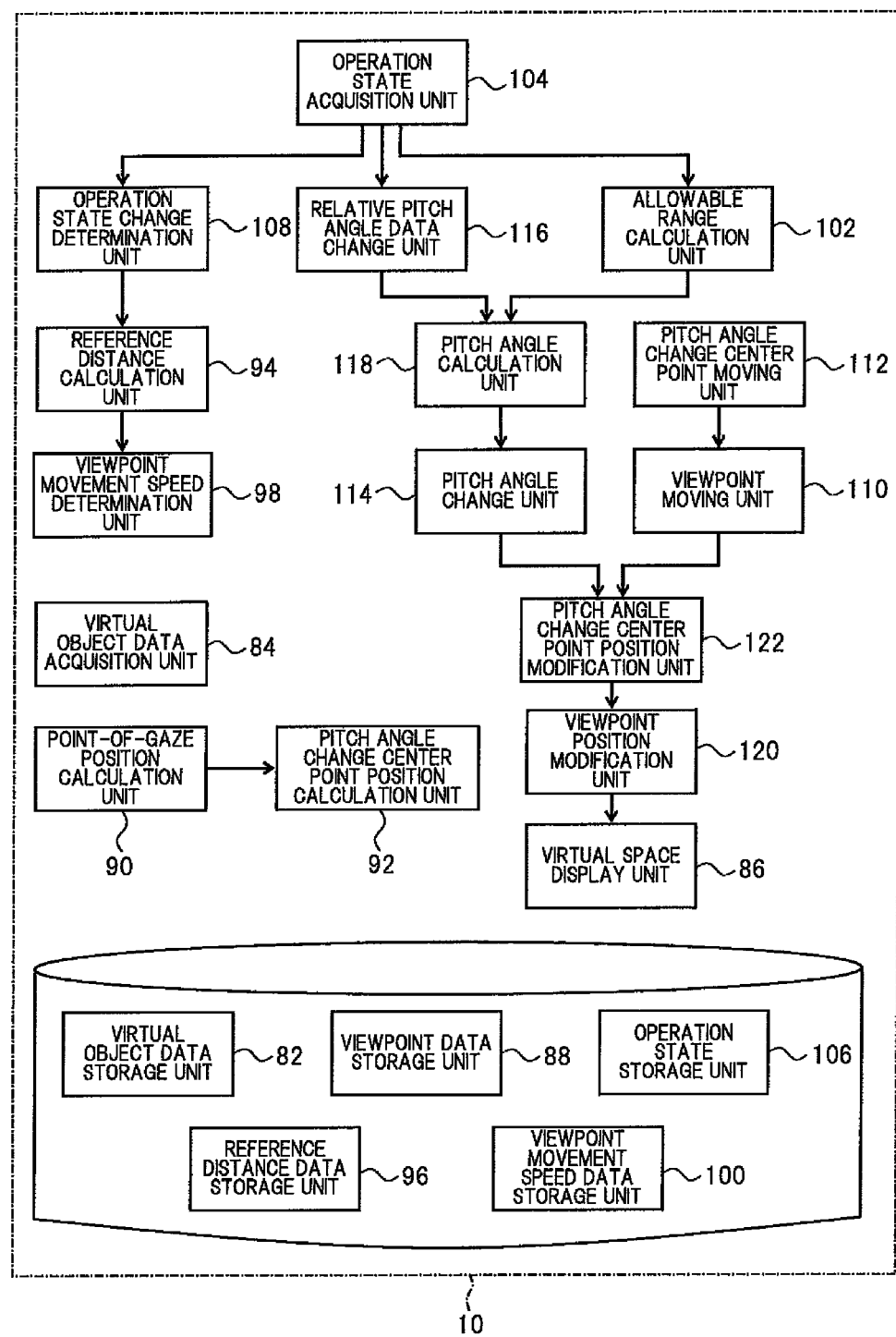
FIG. 6 is a functional block diagram illustrating an example of a function of an entertainment system employed as the image display device according to the embodiment of the present invention.

As illustrated in FIG. 6, the entertainment system 10 according to this embodiment functionally includes a virtual object data storage unit 82, a virtual object data acquisition unit 84, a virtual space display unit 86, a viewpoint data storage unit 88, a point-of-gaze position calculation unit 90, a pitch angle change center point position calculation unit 92, a reference distance calculation unit 94, a reference distance data storage unit 96, a viewpoint movement speed determination unit 98, a viewpoint movement speed data storage unit 100, an allowable range calculation unit 102, an operation state acquisition unit 104, an operation state storage unit 106, an operation state change determination unit 108, a viewpoint moving unit 110, a pitch angle change center point moving unit 112, a pitch angle change unit 114, a relative pitch angle data change unit 116, a pitch angle calculation unit 118, a viewpoint position modification unit 120, and a pitch angle change center point position modification unit 122, and works based on those elements. The entertainment system 10 may not necessarily include all the elements described above.

Figure 8:
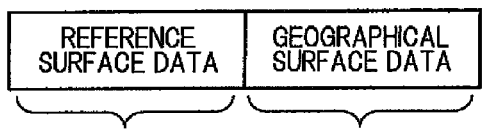
FIG. 8 illustrates an example of a data structure of Earth's surface data.

The virtual object data storage unit 82 is implemented mainly by the main memory 20 and the hard disk 38. The virtual object data storage unit 82 stores virtual object data, such as polygon data and texture data, on a virtual object. In this embodiment, for example, the virtual object data storage unit 82 specifically stores Earth's surface data 124 rendering the Earth's surface of the virtual Earth object 72 (see FIG. 8). FIG. 8 illustrates an example of a data structure of the Earth's surface data 124 according to this embodiment. The Earth's surface data 124 contains reference surface data 126 and geographical surface data 128. The reference surface data 126 is polygon data representing positions of a plurality of polygons in the virtual space 64, the plurality of polygons rendering reference surfaces 130 (for example, ocean surface) of the virtual Earth object 72. In this embodiment, the reference surface 130 is basically spherical in shape. Then, the geographical surface data 128 includes polygon data and texture data. The polygon data represents positions of a plurality of polygons in the virtual space 64, the plurality of polygons rendering geographical surfaces (geographical surface 132) including the mountain 74, the hills 76, and the cliff 78 to be depicted on the surface of the virtual Earth object 72. The texture data is associated with each polygon represented by the polygon data, and represents a texture to be mapped to each polygon. It should be noted that the reference surface data 126 and the geographical surface data 128 may include data indicating a correspondence relation between a combination of a latitude and a longitude and a position in the virtual space 64.

Further, the virtual object data storage unit 82 may manage and store, in a stepwise manner, a plurality of reference surface data items 126 and geographical surface data items 128 which are different from one another in accuracy. Alternatively, the virtual object data storage unit 82 may store polygon data and texture data acquired by the virtual object data acquisition unit 84 to be described later.

The virtual object data acquisition unit 84 is implemented mainly by the MPU 11, the input-output processing unit 28, and the network interface 48. The virtual object data acquisition unit 84 acquires virtual object data from an information processing apparatus such as a server on a network.

In this embodiment, the entertainment system 10 is capable of communicating with a data provision server (not shown) on a network via the network interface 48. Then, the virtual object data acquisition unit 84 transmits, to the data provision server, data indicating a positional relation of the position of the viewpoint 66 and the line of sight 68 with respect to the virtual Earth object 72. In response to this, the data provision server transmits the Earth's surface data 124 to be disposed in the virtual space 64, to the virtual object data acquisition unit 84. The virtual object data acquisition unit 84 acquires the Earth's surface data 124 transmitted from the data provision server. Specifically, for example, the virtual object data acquisition unit 84 acquires, based on the position of the viewpoint 66, polygon data in a size corresponding to the distance to the virtual object at the time and texture data to be mapped to each polygon, from the data provision server.

The virtual space display unit 86 is implemented mainly by the MPU 11, the image processing unit 24, and the monitor 26. The virtual space display unit 86 displays, on the screen of the monitor 26, an image depicting a scene viewed from the viewpoint 66 in the line of sight 68 in the virtual space 64 (scene depicting the view field region 70 which is defined based on the position of the viewpoint 66 and the line of sight 68). Specifically, the virtual space display unit 86 displays, on the screen of the monitor 26, an image rendering the view field region 70 which is defined according to the position of the viewpoint 66 and the line of sight 68, the image being based on the coordinates of a vertex of each polygon represented by polygon data contained in the virtual object data on the virtual objects in the view field region 70, and texture data representing a texture to be mapped to each polygon. Specifically, displayed on the screen of the monitor 26 in this embodiment is, for example, an image based on the coordinates of the vertex of each polygon represented by polygon data contained in the geographical surface data 128 on the virtual Earth object 72 in the view field region 70 and on the texture data representing a texture to be mapped to each polygon.

Here, the virtual space display unit 86 may select the geographical surface data 128 corresponding to an image to be displayed on the screen of the monitor 26, according to a positional relation (for example, distance) between the viewpoint 66 and the virtual object (for example, virtual Earth object 72). In this embodiment, in a case where the distance between the viewpoint 66 and the virtual Earth object 72 is large, the virtual space display unit 86 may display, on the screen of the monitor 26, an image based on texture data on clouds observed from a satellite, which is stored in advance in the virtual object data storage unit 82 (see FIG. 5A). Alternatively, in a case where the distance between the viewpoint 66 and the virtual Earth object 72 is reduced along with the movement of the viewpoint 66, the virtual space display unit 86 may display, on the screen of the monitor 26, an image based on texture data rendering a map centered on Japan (see FIG. 5B). It should be noted that, at this time, the virtual object data acquisition unit 84 may acquire the image based on texture data rendering a map centered on Japan, when the viewpoint 66 is moved. As described above, the virtual space display unit 86 displays an image which is stored in advance in the entertainment system 10 while waiting for the virtual object data acquisition unit 84 to acquire another image, to thereby allow the user of the entertainment system 10 to enjoy the image even during the waiting time before the acquisition of the another image from the data provision server, which reduces stress of having to wait for the another image to be acquired from the data provision server.

It should be noted that the virtual space display unit 86 may instruct the controller 42 to vibrate the vibrator provided to the controller 42 at a timing when the displayed image is updated. Specifically, for example, when an image displayed on the screen of the monitor 26 is switched from an image that is stored in advance in the virtual object data storage unit 82 to an image acquired by the virtual object data acquisition unit 84, the virtual space display unit 86 may instruct the controller 42 to vibrate the vibrator provided to the controller 42.

Alternatively, the virtual space display unit 86 may display an image stored in the virtual object data storage unit 82 on the screen of the monitor 26, the image corresponding to the distance between the position indicating the viewpoint 66 and the position indicating the virtual Earth object 72. Specifically, for example, the virtual space display unit 86 may display a low-definition image on the screen of the monitor 26 in a case where the distance between the position indicating the viewpoint 66 and the position indicating the virtual Earth object 72 is large, whereas the virtual space display unit 86 may display a high-definition image on the screen of the monitor 26 in a case where the distance between the position indicating the viewpoint 66 and the position indicating the virtual Earth object 72 is small (see FIGS. 5B to 5D). Still alternatively, the virtual space display unit 86 may first display a low-definition image on the screen of the monitor 26, and when the acquisition of the high-definition image is completed by the virtual object data acquisition unit 84, the virtual space display unit 86 may display the high-definition image on the screen of the monitor 26.

Figure 9:
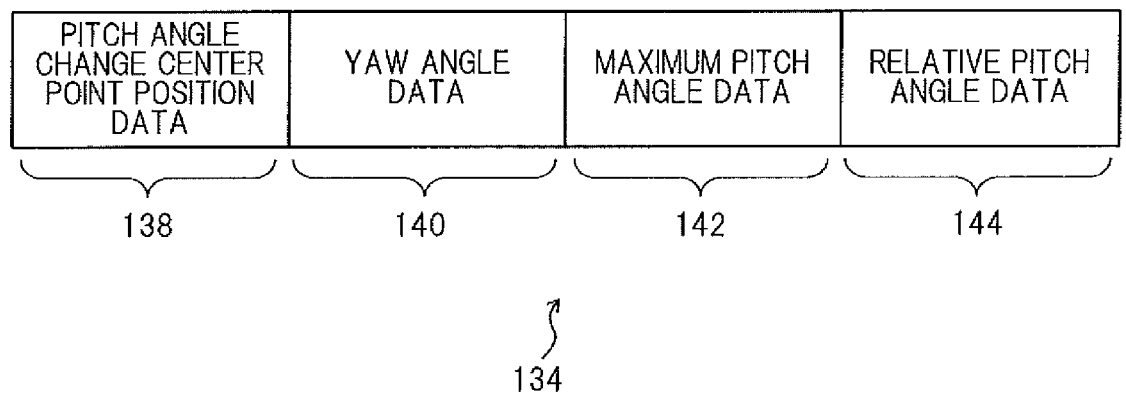
FIG. 9 illustrates an example of a data structure of viewpoint data.

The viewpoint data storage unit 88 is implemented mainly by the main memory 20 and the hard disk 38. The viewpoint data storage unit 88 stores viewpoint data 134 on a position of the viewpoint 66 and the line of sight 68 in the virtual space 64 (see FIG. 9). FIG. 9 illustrates an example of a data structure of the viewpoint data 134 according to this embodiment. It should be noted that the view field region 70 is defined based on the position of the viewpoint 66 and the line of sight 68 indicated by the viewpoint data 134. The viewpoint data 134 is described later in detail.

The point-of-gaze position calculation unit 90 is implemented mainly by the MPU 11. The point-of-gaze position calculation unit 90 calculates the position indicating a point of gaze 136, which is a point of intersection where a straight line extending from a current position of the viewpoint 66 in the line of sight 68 intersects with a virtual object existing on the straight line (see FIG. 10).

Figure 10:
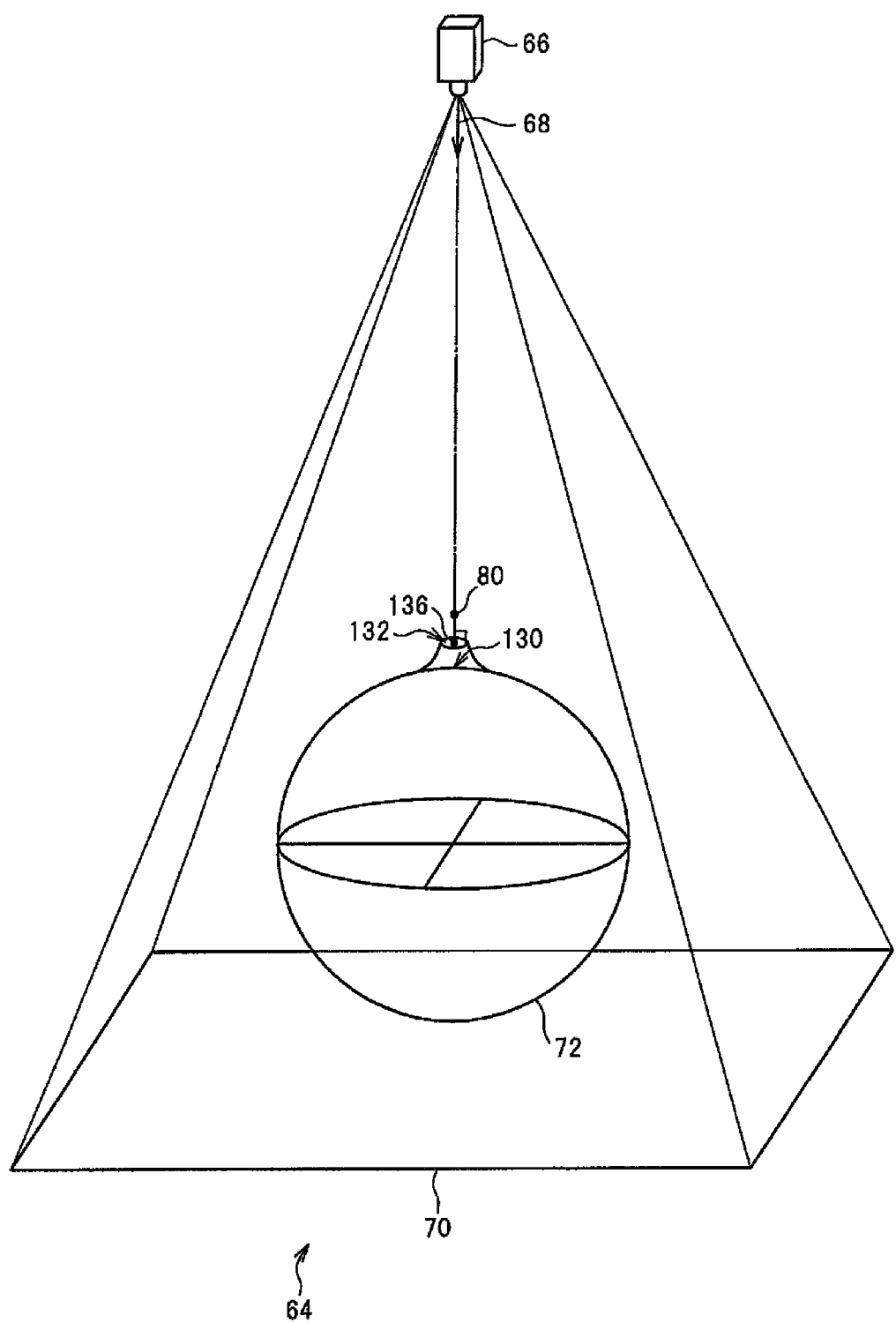
FIG. 10 is an explanatory diagram illustrating an example of a relation, in an initial state, of the virtual Earth object with respect to a position of the viewpoint and a line of sight according to the embodiment of the present invention.

FIG. 10 is an explanatory diagram illustrating an example of a relation, in an initial state, of the virtual Earth object 72 with respect to a position of the viewpoint 66 and the line of sight 68 according to this embodiment. In this embodiment, in the initial state, the line of sight 68 is directed perpendicularly to the Earth's surface (for example, reference surface 130 or geographical surface 132) of the virtual Earth object 72 (see FIG. 4A). Then, the point-of-gaze position calculation unit 90 calculates the position of a point of intersection where a straight line extending from a position of the viewpoint 66 in the line of sight 68 intersects with the geographical surface 132 (specifically, point of intersection of the straight line with a polygon represented by polygon data contained in the geographical surface data 128) in the initial state, as a position indicating the point of gaze 136.

It should be noted that the point-of-gaze position calculation unit 90 may calculate the position indicating the point of gaze 136, based on a position of the viewpoint 66 in a state other than the initial state. Further, when the point-of-gaze position calculation unit 90 calculates the position indicating the point of gaze 136, the line of sight 68 is not necessarily directed perpendicularly to the virtual object. Further, the point-of-gaze position calculation unit 90 may calculate, as the position indicating the point of gaze 136, the position of a point of intersection where the straight line extending from the position of the viewpoint 66 in the line of sight 68 intersects with the reference surface 130 (point of intersection of the straight line with a polygon represented by polygon data contained in the reference surface data 126) in the initial state.

The pitch angle change center point position calculation unit 92 is implemented mainly by the MPU 11. The pitch angle change center point position calculation unit 92 calculates the position of the pitch angle change center point 80 which exists on a straight line extending from the viewpoint 66 in the line of sight 68. Here, the pitch angle change center point position calculation unit 92 may calculate the position of the pitch angle change center point 80 which exists between the position of the viewpoint 66 and the position indicating a virtual object (for example, virtual Earth object 72) when the line of sight 68 is directed to the virtual object (for example, virtual Earth object 72). Alternatively, the pitch angle change center point position calculation unit 92 may calculate the position of the pitch angle change center point 80 which exists between a position indicating the point of gaze 136 and a position of the viewpoint 66, based on a relation between the position indicating the point of gaze 136 and the position of the viewpoint 66 (see FIG. 10). Still alternatively, the pitch angle change center point position calculation unit 92 may calculate, as the position of the pitch angle change center point 80, the position of a point which internally divides, in given proportions, a distance between the position indicating the point of gaze 136 and the position of the viewpoint 66.

Here, the viewpoint data 134 is described in detail. In this embodiment, the viewpoint data 134 contains pitch angle change center point position data 138, yaw angle data 140, maximum pitch angle data 142, and relative pitch angle data 144.

The pitch angle change center point position data 138 represents the position of the pitch angle change center point 80 calculated by the pitch angle change center point position calculation unit 92, and is represented by, for example, a three-dimensional coordinate value.

Figure 7:
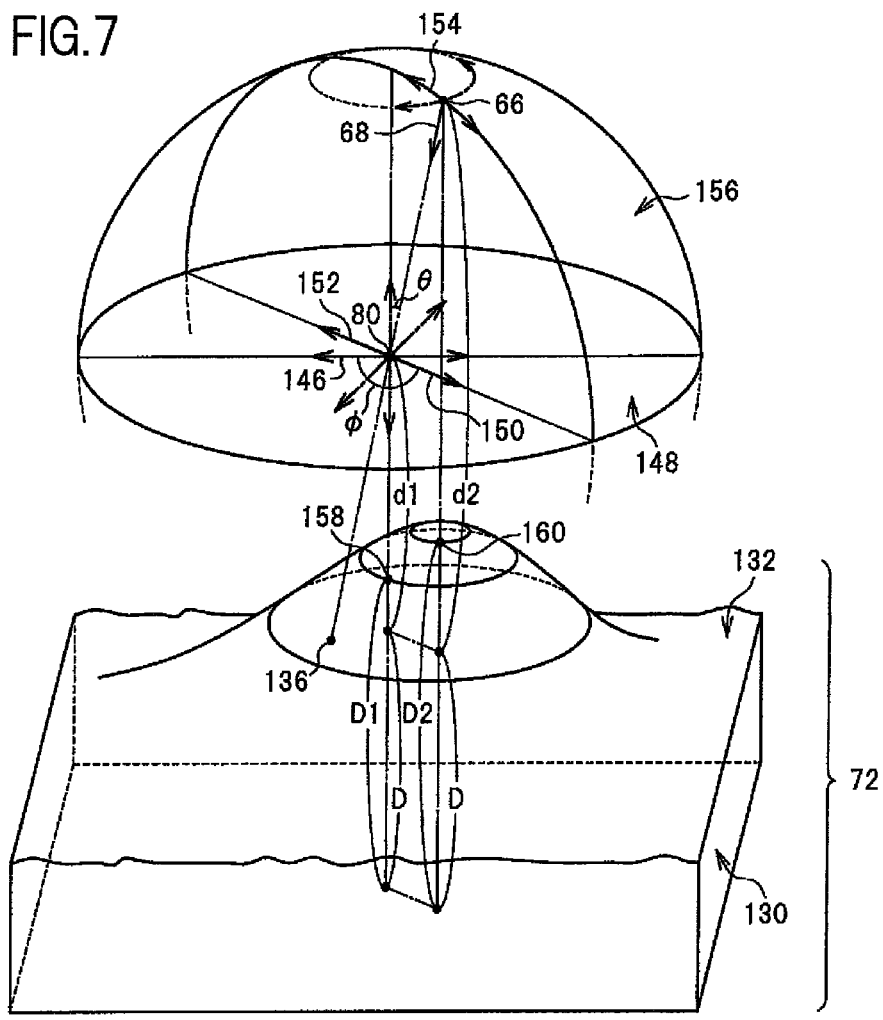
FIG. 7 is an explanatory diagram illustrating an example of a relation of a virtual Earth object with respect to a position of a viewpoint and a line of sight, according to the embodiment of the present invention.

The yaw angle data 140 represents a yaw angle phi formed by the position of the viewpoint 66 with respect to a yaw angle reference direction 146 in a polar coordinate system centered on the position of the pitch angle change center point 80, as illustrated in FIG. 7. Here, the yaw angle reference direction 146 specifically represents, for example, a direction equivalent to a northward direction.

The maximum pitch angle data 142 and the relative pitch angle data 144 represent the pitch angle theta at the position of the viewpoint 66 in the polar coordinate system centered on the position of the pitch angle change center point 80. The maximum pitch angle data 142 and the relative pitch angle data 144 are described later in detail.

Here, a surface which passes through the pitch angle change center point 80 and is equivalent to the reference surface 130 (for example, surface parallel to the reference surface) is referred to as pitch angle change center point reference surface 148. In this case, the yaw angle phi is formed between the yaw angle reference direction 146 and a direction from the position of the pitch angle change center point 80 to the position of the viewpoint 66 with the pitch angle theta of 90 degrees. Here, the direction from the position of the pitch angle change center point 80 to the position of the viewpoint 66 with the pitch angle theta of 90 degrees is referred to as yaw angle direction 150.

It should be noted that the data structure of the viewpoint data 134 is not limited to the above-mentioned data structure.

Specifically, for example, the viewpoint data storage unit 88 may store minimum depression data representing a minimum depression, rather than the maximum pitch angle data 142 representing a maximum pitch angle theta-max. It should be noted that there is a relation between the minimum depression and the maximum pitch angle theta-max that the sum of these angles is 90 degrees. The maximum pitch angle theta-max is described later in detail.

Further, the viewpoint data 134 may be represented by, for example, yaw angle direction data representing the yaw angle direction 150, line of sight data representing the line of sight 68, pitch angle change center point movement reference direction data representing a pitch angle change center point movement reference direction 152 which serves as a reference to be used when the pitch angle change center point 80 is moved by the pitch angle change center point moving unit 112, and a pitch angle change reference direction 154 representing a direction which serves as a reference to be used when the pitch angle of the viewpoint 66 is changed by the pitch angle change unit 114. It should be noted that, in this embodiment, a vector indicating the pitch angle change center point movement reference direction 152 is in the reverse direction to a vector indicating the yaw angle direction 150. Further, in this embodiment, the pitch angle change reference direction 154 is a direction from the current position of the viewpoint 66 to the position of the viewpoint 66 with the pitch angle theta of 0 degrees, along a spherical surface (hereinafter, referred to as pitch angle change surface 156) centering around the pitch angle change center point 80 with its radius as a pitch angle change radius r.

The reference distance calculation unit 94 is implemented mainly by the MPU 11. The reference distance calculation unit 94 calculates, based on virtual object data (in this embodiment, geographical surface data 128), a reference distance representing a distance from the reference surface 130 in the surface of the virtual object. In this embodiment, specifically, for example, the reference distance calculation unit 94 first calculates the position of a pitch angle change center point projected point 158, which is a point of intersection where a straight line passing through the pitch angle change center point 80 as being perpendicular to the reference surface 130 intersects with the geographical surface 132 (specifically, for example, point of intersection of the straight line with a polygon represented by polygon data contained in the geographical surface data 128). Then, the reference distance calculation unit 94 calculates the distance between the pitch angle change center point projected point 158 and the reference surface 130, as a first geographical surface distance D1 (see FIG. 7). The reference distance calculation unit 94 further calculates the position of a viewpoint projected point 160, which is a point of intersection where a straight line passing through the viewpoint 66 as being perpendicular to the reference surface 130 intersects with the geographical surface 132. The reference distance calculation unit 94 then calculates the distance between the viewpoint projected point 160 and the reference surface 130, as a second geographical surface distance D2 (see FIG. 7).

After that, the reference distance calculation unit 94 calculates a geographical surface reference distance D, based on the first geographical surface distance D1 and the second geographical surface distance D2. In this embodiment, the reference distance calculation unit 94 calculates the value of the first geographical surface distance D1, as a value of the geographical surface reference distance D.

Alternatively, the reference distance calculation unit 94 may calculate the value of the second geographical surface distance D2, as a value of the geographical surface reference distance D. Still alternatively, the reference distance calculation unit 94 may calculate a mean value of the value of the first geographical surface distance D1 and the value of the second geographical surface distance D2, as a value of the geographical surface reference distance D.

The reference distance data storage unit 96 is implemented mainly by the main memory 20 and the hard disk 38. The reference distance data storage unit 96 stores reference distance data representing a reference distance calculated by the reference distance calculation unit 94. Specifically, the reference distance data storage unit 96 stores, for example, geographical surface reference distance data representing the geographical surface reference distance D.

The reference distance calculation unit 94 may update the reference distance data stored in the reference distance data storage unit 96 to the reference distance data representing a reference distance calculated by the reference distance calculation unit 94, in a case where a difference between the calculated reference distance and the reference distance stored in the reference distance data storage unit 96 is larger than a given value (for example, geographical surface reference distance buffer delta-D).

The viewpoint movement speed determination unit 98 is implemented mainly by the MPU 11. The viewpoint movement speed determination unit 98 determines a movement speed v of the viewpoint 66, based on a virtual object-to-viewpoint distance, according to a viewpoint moving operation performed by the user. The virtual object-to-viewpoint distance is a distance based on a relation between a position indicating a virtual object (virtual Earth object 72 in this embodiment) included in the view field region 70 and a position indicating the viewpoint 66.

Alternatively, the viewpoint movement speed determination unit 98 may determine the value of the movement speedy of the viewpoint 66 in a manner that the value of the movement speed v increases as the value of the virtual object-to-viewpoint distance increases. Specifically, for example, the viewpoint movement speed determination unit 98 may determine the value of the movement speed v in a manner that the value of the movement speed v is proportional to the value of the virtual object-to-viewpoint distance.

With this configuration, the user may carry out an operation of moving the viewpoint with high precision.

In this embodiment, specifically, for example, the viewpoint movement speed determination unit 98 calculates a pitch angle change center point-to-geographical surface distance d1, which is a distance between the pitch angle change center point 80 and the pitch angle change center point projected point 158 (or geographical surface 132). At this time, the viewpoint movement speed determination unit 98 may calculate the pitch angle change center point-to-geographical surface distance d1, based on a difference value between a distance from the pitch angle change center point 80 to the reference surface 130 and the geographical surface reference distance D indicated by the geographical surface reference distance data stored in the reference distance data storage unit 96 (see FIG. 7).

Then, the viewpoint movement speed determination unit 98 calculates the value of the pitch angle change radius r, based on the value of the pitch angle change center point-to-geographical surface distance d1. Specifically, for example, the viewpoint movement speed determination unit 98 calculates, as the value of the pitch angle change radius r, a value obtained by multiplying the value of the pitch angle change center point-to-geographical surface distance d1 by a given value. As described above, the pitch angle change radius r may be proportional at a given ratio to the pitch angle change center point-to-geographical surface distance d1. It is obvious that the viewpoint movement speed determination unit 98 may calculate, at this time, the value of the pitch angle change radius r.

In this embodiment, the virtual object-to-viewpoint distance is a sum (d1+r) of the pitch angle change center point-to-geographical surface distance d1 and the pitch angle change radius r. In other words, the viewpoint movement speed determination unit 98 determines the movement speed of the viewpoint 66, based on the value of (d1+r).

It is obvious that the method for calculating the virtual object-to-viewpoint distance is not limited to the above-mentioned method.

Alternatively, the viewpoint movement speed determination unit 98 may determine the movement speed of the viewpoint 66 in a direction along the reference surface 130 or along the geographical surface 132. Still alternatively, the movement speed of the viewpoint 66 may be determined with respect to a direction perpendicular to the reference surface 130 or to the geographical surface 132. Still alternatively, the viewpoint movement speed determination unit 98 may determine the movement speed of the pitch angle change center point 80, instead of the movement speed of the viewpoint 66.

The viewpoint movement speed data storage unit 100 stores movement speed data representing the movement speed of the viewpoint 66 which is determined by the viewpoint movement speed determination unit 98. The viewpoint movement speed data storage unit 100 may store movement speed data at the start of the operation. Here, alternatively, the viewpoint movement speed data storage unit 100 may store movement speed data representing the movement speed of the pitch angle change center point 80.

Figure 11:
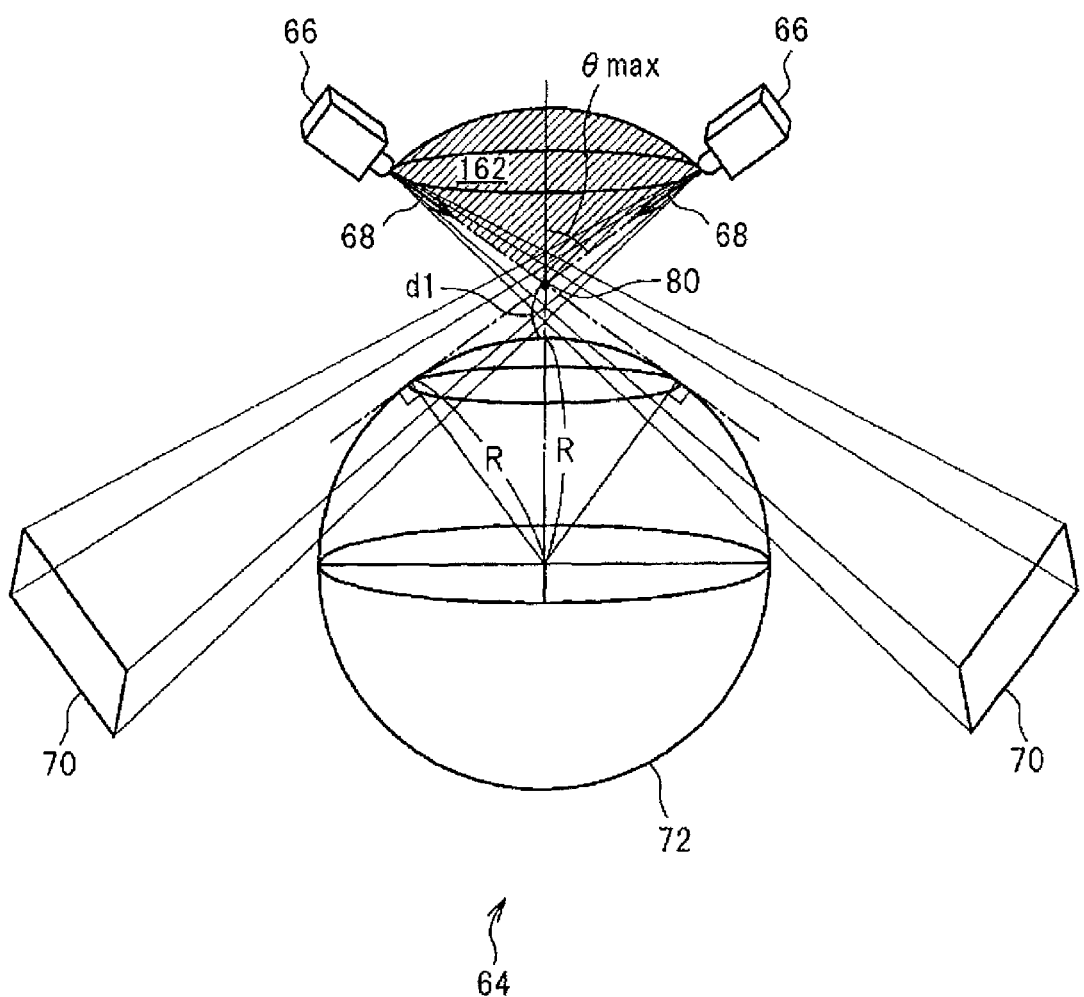
FIG. 11 is a diagram illustrating an example of an allowable range.
Figure 12:
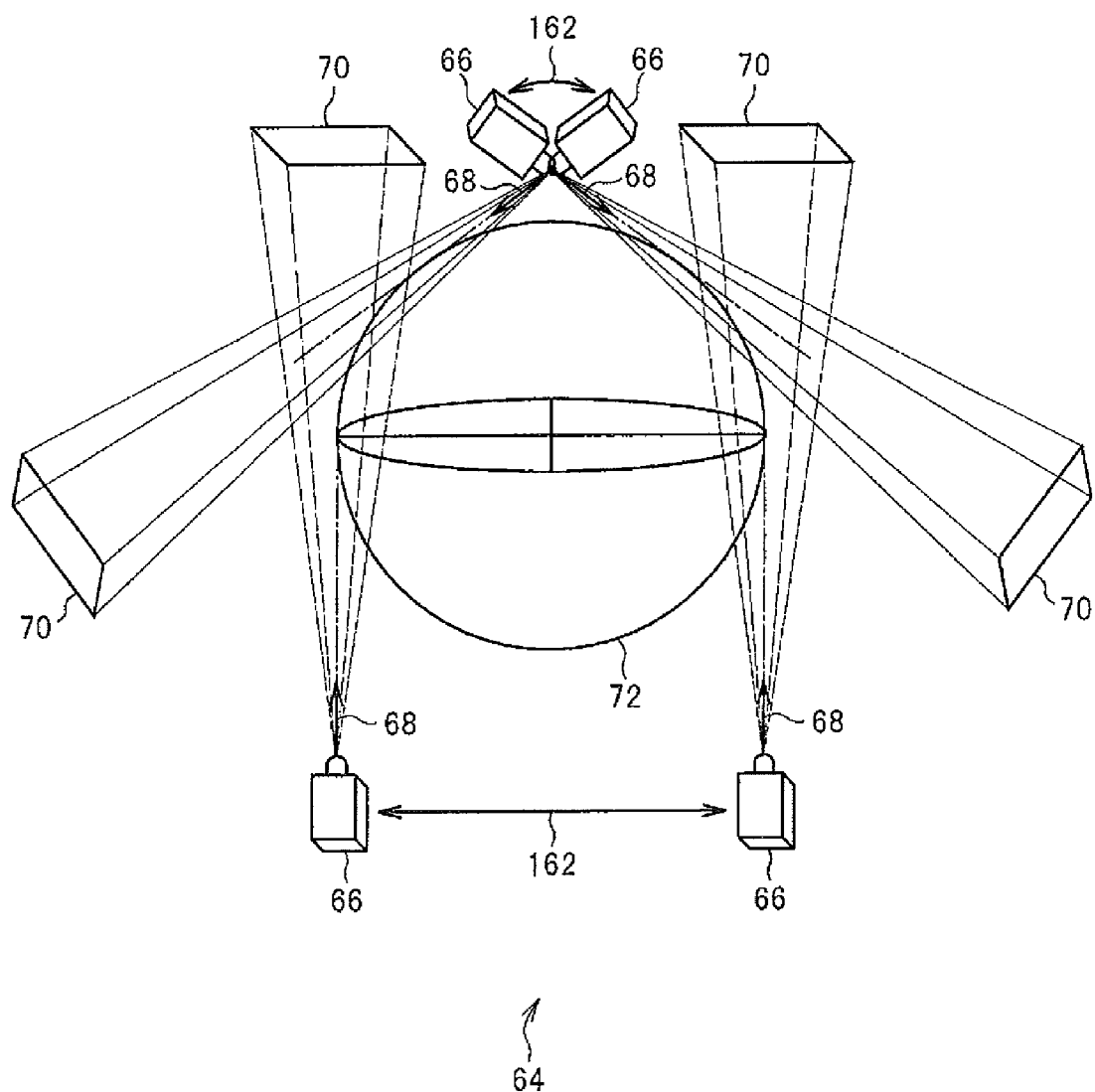
FIG. 12 is a diagram illustrating another example of the allowable range.

The allowable range calculation unit 102 is implemented mainly by the MPU 11. The allowable range calculation unit 102 calculates, based on a size of an area where the view field region 70 overlaps with a closed region occupied by a virtual object (for example, virtual Earth object 72 in this embodiment), an allowable range 162 such as an allowable range for moving the position of the viewpoint 66 or an allowable range for changing the line of sight 68 (see FIG. 11). FIG. 11 is a diagram illustrating an example of the allowable range 162. FIG. 12 is a diagram illustrating another example of the allowable range 162. The allowable range calculation unit 102 may calculate, as illustrated in FIG. 12, only the allowable range for moving the position of the viewpoint 66, or may calculate only the allowable range for changing the line of sight 68. Naturally, the allowable range calculation unit 102 may calculate both of the allowable range for moving the position of the viewpoint 66 and the allowable range for changing the line of sight 68.

In this embodiment, the allowable range calculation unit 102 calculates, as illustrated in FIG. 11, a range of the pitch angle theta. Then, the allowable range calculation unit 102 calculates, as a boundary between the inside and the outside of the allowable range, the position of the viewpoint 66 or the line of sight 68 when a straight line passing through the pitch angle change center point 80 and the viewpoint 66 extends in a direction equivalent to a tangent line direction with respect to the closed region occupied by the virtual Earth object 72. Then, the pitch angle theta at this time is referred to as maximum pitch angle theta-max.

Here, for example, the allowable range calculation unit 102 calculates the maximum pitch angle theta-max from an equation theta-max=arcsin {R/(R+d1)}, based on a geographical surface-to-center distance R, which is a distance between the center of the virtual Earth object 72 and the geographical surface 132, and the pitch angle change center point-to-geographical surface distance d1.

Here, the allowable range calculation unit 102 may estimate the maximum pitch angle theta-max by using a reference surface-to-center distance R' between the center of the virtual Earth object 72 and the reference surface, which is easy to calculate, instead of using the geographical surface-to-center distance R. It is obvious that, at this time, the allowable range calculation unit 102 may calculate the maximum pitch angle theta-max by using a pitch angle change center point-to-reference surface distance d' between the pitch angle change center point 80 and the reference surface 130, instead of using the pitch angle change center point-to-geographical surface distance d1. Alternatively, the allowable range calculation unit 102 may calculate the closed region occupied by a virtual object, which is to be used for calculating the allowable range, based on the virtual object. Specifically, for example, the allowable range calculation unit 102 may calculate the closed region indicated by a virtual object, based on a convex hull of the virtual object.

In this embodiment, the viewpoint data storage unit 88 stores the maximum pitch angle data 142 representing the maximum pitch angle theta-max calculated by the allowable range calculation unit 102.

As described above, the allowable range calculation unit 102 may calculate, as a boundary between the inside and the outside of the allowable range 162, the position of the viewpoint 66 or the line of sight 68 when the line of sight 68 is directed in a direction equivalent to a tangent line direction with respect to the closed region occupied by a virtual object (for example, virtual Earth object 72 in this embodiment).

The operation state acquisition unit 104 acquires an operation state of the controller 42 at predetermined intervals (in this embodiment, specifically, every 1/60 seconds, for example). The operation state is specifically represented by, for example, a digital value (0 to 255) indicating the depressing force or the posture data (0<=X<=255, 0<=Y<=255). In this embodiment, at least posture data representing the operation states of the left operation stick 54 and the right operation stick 56 and digital values representing the depressing forces applied to the left operation stick 54, to the right operation stick 56, to the second left button 52L, and to the second right button 52R are acquired. Then, the operation state acquisition unit 104 determines, based on the operation states thus acquired, the contents of the operation performed by the user.

In this embodiment, specifically, for example, when the operation state acquisition unit 104 has acquired posture data on the left operation stick 54 or when the operation state acquisition unit 104 has acquired a digital value that indicates a depressing force applied to the second left button 52L or to the second right button 52R and is equal to or larger than a given value, the operation state acquisition unit 104 determines that the operation performed by the user is an operation of moving the pitch angle change center point. Alternatively, when the operation state acquisition unit 104 has acquired posture data on the right operation stick 56 and a digital value that indicates a depressing force applied to the right operation stick and is equal to or larger than a given value, the operation state acquisition unit 104 determines that the operation performed by the user is an operation of changing the pitch angle or an operation of changing the yaw angle. Those operations are described later in detail.

The operation state storage unit 106 is implemented mainly by the main memory 20 or the hard disk 38. The operation state storage unit 106 stores operation state data representing the operation state acquired by the operation state acquisition unit 104.

The operation state change determination unit 108 is implemented mainly by the MPU 11. The operation state change determination unit 108 compares the operation state represented by the operation state data stored in the operation state storage unit 106 with the operation state detected by the operation state acquisition unit 104, to thereby determine whether or not there is a change in the detected data.

The viewpoint moving unit 110 is implemented mainly by the MPU 11. The viewpoint moving unit 110 performs at least one of the operation of moving the position of the viewpoint and the operation of changing the line of sight, in response to the viewpoint moving operation performed by the user.

At this time, the viewpoint moving unit 110 may be allowed to perform the operation of moving the position of the viewpoint and the operation of changing the line of sight, within the allowable range 162 calculated by the allowable range calculation unit 102. Alternatively, the viewpoint moving unit 110 may move the position of the viewpoint 66 at the movement speed v determined by the viewpoint movement speed determination unit 98.

The pitch angle change center point moving unit 112 is implemented mainly by the MPU 11. The pitch angle change center point moving unit 112 moves the position of the pitch angle change center point 80 in response to the pitch angle change center point moving operation made by the user, and changes at least the line of sight 68 so that the line of sight 68 is directed to the pitch angle change center point 80 from the position of the viewpoint 66. Alternatively, when the position of the pitch angle change center point 80 is moved, the pitch angle change center point moving unit 112 may calculate the yaw angle phi based on the position of the pitch angle change center point 80 thus moved.

Alternatively, the viewpoint moving unit 110 may move the viewpoint 66 in association with the movement of the pitch angle change center point 80 made by the pitch angle change center point moving unit 112. Specifically, for example, the viewpoint moving unit 110 may move the viewpoint 66 by a distance covered by the movement of the pitch angle change center point 80 made by the pitch angle change center point moving unit 112. Still alternatively, when the pitch angle change center point-to-geographical surface distance d1 changes in value due to the movement made by the pitch angle change center point moving unit 112, the viewpoint moving unit 110 may calculate the pitch angle change radius r based on the pitch angle change center point-to-geographical surface distance d1 thus changed, and may move the position of the viewpoint 66 based on the pitch angle change radius r thus calculated.

In this embodiment, based on the posture data (X, Y) of the left operation stick 54 acquired by the operation state acquisition unit 104, the pitch angle change center point moving unit 112 moves the pitch angle change center point 80 to a position on the coordinates in which the Y-axis direction and the X-axis direction of the left operation stick 54 are associated with the pitch angle change center point movement reference direction 152 and with a direction of 90 degrees to the right with respect to the pitch angle change center point movement reference direction 152, respectively.

Specifically, for example, when the operation state acquisition unit 104 acquires an operation state indicating that the left operation stick 54 is operated upward, the pitch angle change center point moving unit 112 moves the pitch angle change center point 80 in the direction of the pitch angle change center point movement reference direction 152. Meanwhile, when the operation state acquisition unit 104 acquires an operation state indicating that the left operation stick 54 is operated downward, the pitch angle change center point moving unit 112 moves the pitch angle change center point 80 in the direction opposite to the pitch angle change center point movement reference direction 152 (that is, direction of the yaw angle direction 150). When the operation state acquisition unit 104 acquires an operation state indicating that the left operation stick 54 is operated leftward (rightward), the pitch angle change center point moving unit 112 moves the pitch angle change center point 80 in the direction of 90 degrees to the left (90 degrees to the right) with respect to the pitch angle change center point movement reference direction 152.

Further, in this embodiment, when the operation state acquisition unit 104 has acquired a digital value that indicates a depressing force applied to the second left button 52L and is equal to or larger than a given value, the pitch angle change center point moving unit 112 moves the pitch angle change center point 80 in a direction perpendicular to the pitch angle change center point reference surface 148 and away from the virtual Earth object 72. Alternatively, when the operation state acquisition unit 104 has acquired a digital value that indicates a depressing force applied to the second right button 52R and is equal to or larger than a given value, the pitch angle change center point moving unit 112 moves the pitch angle change center point 80 in a direction perpendicular to the pitch angle change center point reference surface 148 and of approaching to the virtual Earth object 72.

Further, at this time, the pitch angle change center point moving unit 112 may move the position of the pitch angle change center point 80 at a movement speed v' of the pitch angle change center point 80, which is based on the movement speed v determined by the viewpoint movement speed determination unit 98. Specifically, for example, when the posture data of the left operation stick 54 acquired by the operation state acquisition unit 104 takes the value (X, Y) and the movement speed v' of the pitch angle change center point 80 is equal to the value of v, the pitch angle change center point moving unit 112 may move the pitch angle change center point 80 by (vX, vY) from the current position thereof. In this manner, the pitch angle change center point moving unit 112 may move the pitch angle change center point 80 at a movement speed based on a value obtained by multiplying the value of an operation amount of the posture data or the like by the value of the movement speed v. It is obvious that the viewpoint moving unit 110 may move the viewpoint 66 at a movement speed, based on the value obtained by multiplying the value of the operation amount by the value of the movement speedy. Further, the position of the pitch angle change center point 80 may be moved at the movement speed v' of the pitch angle change center point 80, which is based on the movement speed v determined by the viewpoint movement speed determination unit 98, even in a case of moving the pitch angle change center point 80 by the second left button 52L or the second right button 52R in a direction perpendicular to the pitch angle change center point reference surface 148.

The pitch angle change unit 114 is implemented mainly by the MPU 11. The pitch angle change unit 114 changes the pitch angle theta about the pitch angle change center point 80, in response to the pitch angle changing operation performed by the user, and changes the line of sight 68 so that the line of sight 68 is directed to the pitch angle change center point 80 from the position of the viewpoint 66 with the pitch angle thus changed.

At this time, the pitch angle change unit 114 may change the pitch angle theta within the range of the pitch angle theta.

The relative pitch angle data change unit 116 is implemented mainly by the MPU 11. When the relative pitch angle data 144 is stored in the viewpoint data storage unit 88, the relative pitch angle data change unit 116 changes the relative pitch angle data 144 in response to a relative pitch angle changing operation performed by the user. Here, the relative pitch angle data 144 represents a relative pitch angle theta-prime (0<=theta-prime<=1), which is a ratio of an angle formed by a straight line passing through the pitch angle change center point 80 and the viewpoint 66 with a straight line that is perpendicular to a region indicating a virtual object (virtual Earth object 72 in this embodiment) and passes through the pitch angle change center point 80, with respect to the maximum pitch angle theta-max.

The pitch angle calculation unit 118 is implemented mainly by the MPU 11. The pitch angle calculation unit 118 calculates, based on the relative pitch angle theta-prime represented by the relative pitch angle data 144 and the maximum pitch angle theta-max, the pitch angle theta formed by the straight line passing through the pitch angle change center point 80 and the viewpoint with the straight line that is perpendicular to a region indicating the virtual object and passes through the pitch angle change center point 80. More specifically, for example, the pitch angle calculation unit 118 may calculate the pitch angle theta, based on a value obtained by multiplying an angle indicated by the maximum pitch angle theta-max by the relative pitch angle theta-prime (theta-max*theta-prime).

In this embodiment, the relative pitch angle data change unit 116 increases or decreases the relative pitch angle theta-prime represented by the relative pitch angle data 144, based on the posture data (X, Y) of the right operation stick 56 acquired by the operation state acquisition unit 104. Further, in this embodiment, the pitch angle change unit 114 also increases or decreases the yaw angle phi represented by the yaw angle data 140. That is, the pitch angle change unit 114 also changes the yaw angle phi. Specifically, for example, when the value of Y acquired by the operation state acquisition unit 104 is positive (negative), the relative pitch angle data change unit 116 decreases (increases) the value of the relative pitch angle theta-prime. Meanwhile, when the value of X acquired by the operation state acquisition unit 104 is positive (negative), the pitch angle change unit 114 increases (decreases) the value of the yaw angle phi.

The pitch angle calculation unit 118 calculates the pitch angle theta, based on the relative pitch angle data 144 thus changed. Then, the pitch angle change unit 114 changes the pitch angle theta or the yaw angle phi, based on the calculated value of the pitch angle theta, the calculated value of the yaw angle phi, and the current position of the pitch angle change center point 80. As described above, the pitch angle change unit 114 may change the pitch angle theta or the yaw angle phi, based on the pitch angle theta calculated by the pitch angle calculation unit 118 and the position of the pitch angle change center point 80.

When the operation state acquisition unit 104 has acquired a digital value that indicates a depressing force applied to the right operation stick 56 and is equal to or larger than a given value, the pitch angle change unit 114 changes the yaw angle phi while keeping the pitch angle theta constant so that the viewpoint 66 is disposed at a position where the yaw angle phi forms 180 degrees with respect to the yaw angle reference direction 146. In this manner, the user may be allowed to change the yaw angle phi so that the line of sight 68 is directed north.

Further, the allowable range calculation unit 102 may recalculate the allowable range, when the pitch angle change center point moving unit 112 has moved the position of the pitch angle change center point 80. Specifically, for example, the pitch angle change center point moving unit 112 may recalculate the value of the maximum pitch angle theta-max. At this time, the pitch angle calculation unit 118 may recalculate the pitch angle theta, based on a value obtained by multiplying an angle indicated by the recalculated maximum pitch angle theta-max by the relative pitch angle theta-prime (theta-max*theta-prime). Further, at this time, the pitch angle change unit 114 may change the pitch angle theta, based on the recalculated pitch angle theta and the position of the pitch angle change center point 80.

The viewpoint position modification unit 120 is implemented mainly by the MPU 11. When the viewpoint moving unit 110 moves the viewpoint 66, the viewpoint position modification unit 120 measures a distance between the position indicating the viewpoint 66 and the position indicating a virtual object (virtual Earth object 72 in this embodiment). When the distance is smaller than a given distance, the viewpoint position modification unit 120 modifies the position of the viewpoint 66 in a distance away from the virtual object. In this way, when the viewpoint 66 almost comes into contact with the geographical surface 132, the viewpoint 66 is moved so as to avert the contact. Further, in this embodiment, the viewpoint 66 may be prevented from going hidden under the geographical surface 132 (see FIG. 5J). It should be noted that the viewpoint position modification unit 120 may instruct the controller 42 to vibrate the vibrator provided to the controller 42 when modifying the position of the viewpoint 66.

In this embodiment, for example, the viewpoint position modification unit 120 calculates a viewpoint-to-geographical surface distance d2, which is a distance from the viewpoint 66 to the viewpoint projected point 160 (or to geographical surface 132). At this time, the viewpoint position modification unit 120 may calculate the viewpoint-to-geographical surface distance d2, based on a value of a difference between the distance from the viewpoint 66 to the reference surface 130 and the geographical surface reference distance D represented by the geographical surface reference distance data stored in the reference distance data storage unit 96 (see FIG. 7).

When the value of the viewpoint-to-geographical surface distance d2 is smaller than a minimum viewpoint-to-geographical surface distance d2 min, which is a given threshold value, the viewpoint position modification unit 120 modifies the position of the viewpoint 66 so that the value of the viewpoint-to-geographical surface distance d2 becomes equal to or larger than the value of the minimum viewpoint-to-geographical surface distance d2 min. Specifically, for example, the viewpoint position modification unit 120 modifies the position of the viewpoint 66 along a straight line that is perpendicular to the reference surface 130 and passes through the viewpoint 66, in a direction opposite with respect to the reference surface 130 so that the value of the viewpoint-to-geographical surface distance d2 becomes equal to the value of the minimum viewpoint-to-geographical surface distance d2 min. At the same time, the viewpoint position modification unit 120 may also modify the position of the pitch angle change center point 80.

The pitch angle change center point position modification unit 122 is implemented mainly by the MPU 11. The pitch angle change center point position modification unit 122 measures the position indicating the pitch angle change center point 80 and the position indicating a virtual object (for example, virtual Earth object 72 in this embodiment) and obtains a distance therebetween, when the viewpoint moving unit 110 moves the viewpoint 66. When the distance falls out of a given range, the pitch angle change center point position modification unit 122 modifies the position of the pitch angle change center point 80 so that the distance falls within this range. At the same time, the viewpoint moving unit 110 may also modify the position of the viewpoint 66. In this manner, for example, the position of the pitch angle change center point 80 and the position of the viewpoint 66 may be modified when the position of the viewpoint 66 with respect to the geographical surface 132 and the position of the pitch angle change center point 80 with respect to the geographical surface 132 are both largely changed as falling out of the given range (see FIGS. 5G to 5I).

In this embodiment, for example, when the reference distance calculation unit 94 updates the reference distance data stored in the reference distance data storage unit 96 to reference distance data indicating a reference distance calculated by the reference distance calculation unit 94, the pitch angle change center point position modification unit 122 modifies the position of the pitch angle change center point 80, based on the difference between the reference distance before the update and the reference distance after the update.

Next, an example of processing performed at predetermined intervals (every 1/60 seconds in this embodiment) in the entertainment system 10 according to this embodiment is described with reference to an explanatory diagram illustrated in FIG. 7 and flow charts illustrated in FIGS. 13 and 14.

Figure 13:
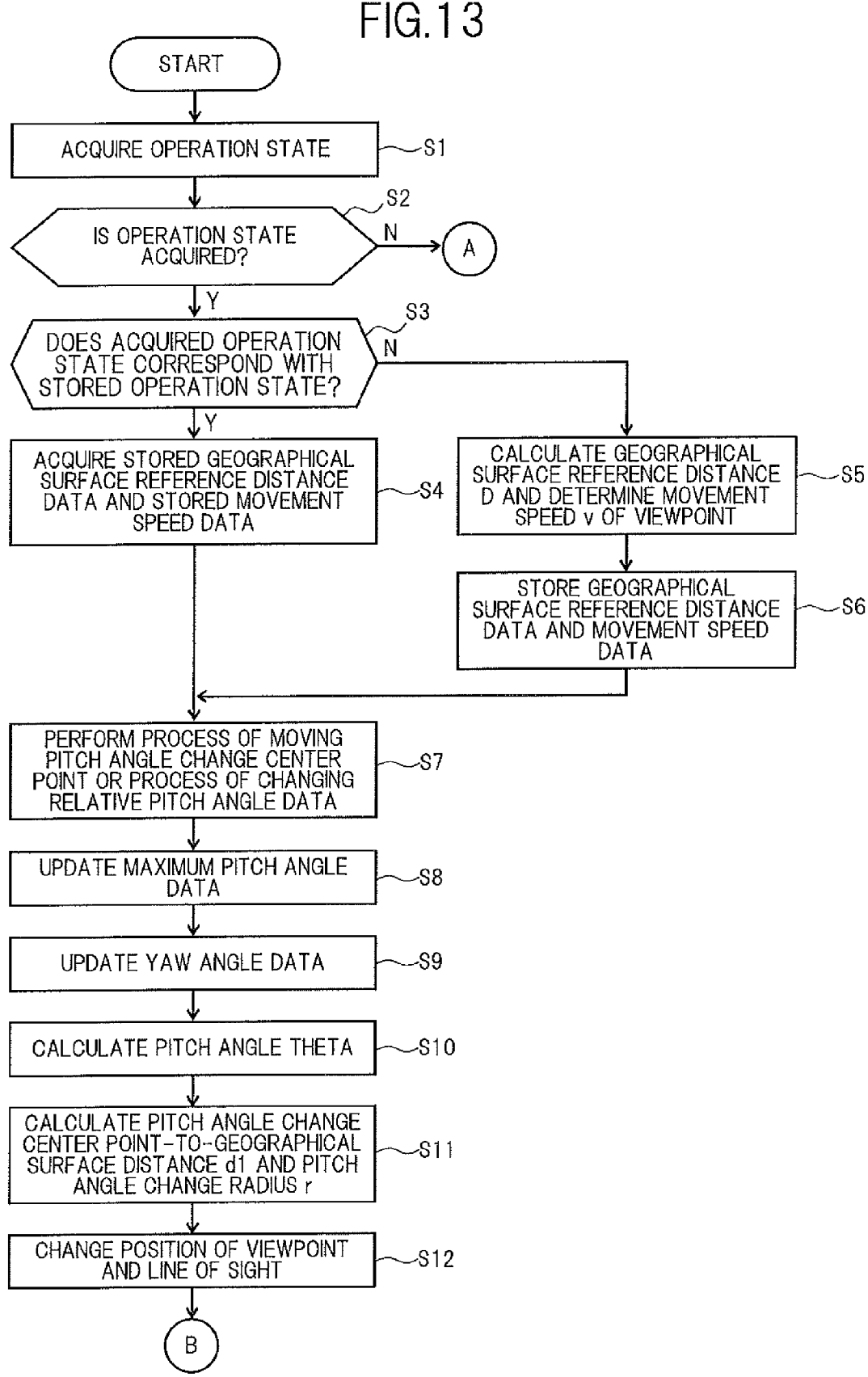
FIG. 13 is a flow chart illustrating an example of a flow of processing performed in the entertainment system according to the embodiment of the present invention.
Figure 14:
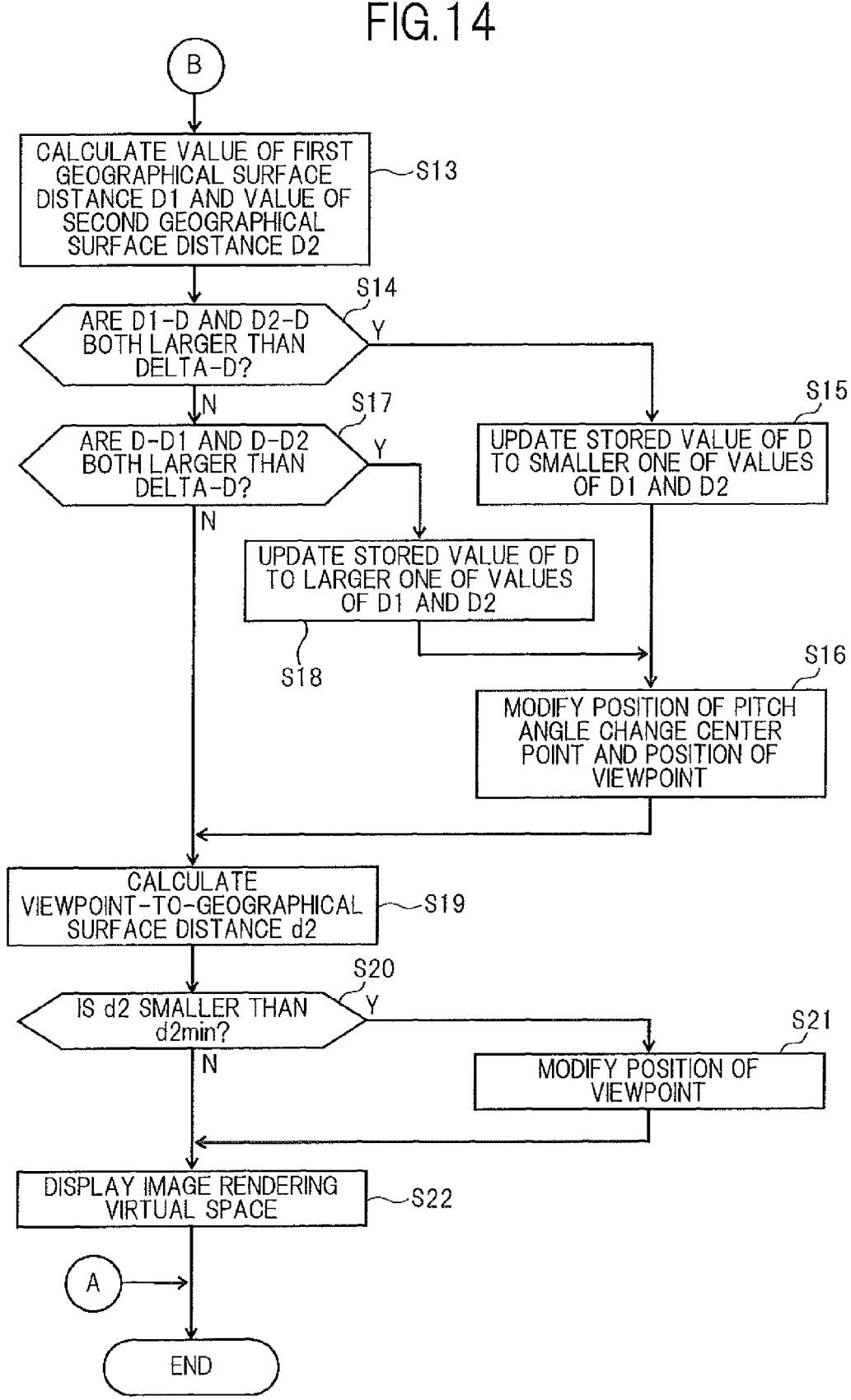
FIG. 14 is a flow chart illustrating the example of the flow of the processing performed in the entertainment system according to the embodiment of the present invention.

FIGS. 13 and 14 are flow charts illustrating processing according to this embodiment, of the processing performed at predetermined intervals in the entertainment system 10. The MPU 11 executes a program supplied to the entertainment system 10 via an information communication medium such as a DVD-ROM or via a communication network such as the Internet, to thereby implement the processing illustrated in FIGS. 13 and 14.

First, the operation state acquisition unit 104 acquires the operation state of the controller 42 (S1).

Then, the operation state change determination unit 108 checks whether or not the operation state of the controller 42 is acquired in the process of S1 (S2). In a case where the operation state change determination unit 108 has determined that the operation state of the controller 42 is not acquired (S2:N), the processing is ended.

In a case where the operation state change determination unit 108 has determined that the operation state of the controller 42 is acquired (S2:Y), it is determined whether or not the operation state indicated by the operation state data stored in the operation state storage unit 106 corresponds with the operation state acquired by the operation state acquisition unit 104 in the process of S1 (S3).

When the operation state indicated by the operation state data stored in the operation state storage unit 106 corresponds with the operation state detected in the process of S1 (S3:Y), the geographical surface reference distance data stored in the reference distance data storage unit 96 and the movement speed data stored in the viewpoint movement speed data storage unit 100 are acquired (S4).

When the operation state indicated by the operation state data stored in the operation state storage unit 106 does not correspond with the operation state detected in the process of S1 (S3:N), the reference distance calculation unit 94 calculates the geographical surface reference distance D, and the viewpoint movement speed determination unit 98 determines the movement speed v of the viewpoint 66 (S5). Then, the reference distance calculation unit 94 stores, in the reference distance data storage unit 96, the geographical surface reference distance data representing the geographical surface reference distance D thus calculated. At this time, when the geographical surface reference distance data is already stored in the reference distance data storage unit 96, the reference distance calculation unit 94 updates the stored geographical surface reference distance data. Then, the viewpoint movement speed determination unit 98 stores the movement speed data representing the movement speed v thus determined, in the viewpoint movement speed data storage unit 100. At this time, when the movement speed data is already stored in the viewpoint movement speed data storage unit 100, the viewpoint movement speed determination unit 98 updates the stored movement speed data (S6).

Then, based on the movement speed v represented by the movement speed data acquired in the process of S4 or on the movement speed v determined in the process of S5, the pitch angle change center point 80 is moved by the pitch angle change center point moving unit 112 or the relative pitch angle data 144 is changed by the relative pitch angle data change unit 116 (S7).

Then, the allowable range calculation unit 102 calculates, based on the moved position of the pitch angle change center point 80, the maximum pitch angle theta-max, and updates the maximum pitch angle data 142 stored in the viewpoint data storage unit 88 to the maximum pitch angle data 142 representing the maximum pitch angle theta-max thus calculated (S8).

Then, the pitch angle change center point moving unit 112 calculates, based on the position of the pitch angle change center point 80, the yaw angle phi, and updates the yaw angle data 140 stored in the viewpoint data storage unit 88 (S9).

The pitch angle calculation unit 118 then calculates the pitch angle theta, based on the relative pitch angle theta represented by the relative pitch angle data 144 and the maximum pitch angle theta-max represented by the maximum pitch angle data 142 (S10).

The viewpoint movement speed determination unit 98 then calculates the pitch angle change center point-to-geographical surface distance d1 and the pitch angle change radius r, which is a value obtained by multiplying the pitch angle change center point-to-geographical surface distance d1 by a given ratio (S11).

Then, the viewpoint moving unit 110 calculates the position of the viewpoint 66 and the line of sight 68, based on the current position of the pitch angle change center point 80, the pitch angle change radius r calculated in the process of S11, the yaw angle phi calculated in the process of S9, and the pitch angle theta calculated in the process of S10. The viewpoint moving unit 110 then moves the viewpoint 66 to the calculated position and changes the line of sight 68 to the calculated direction (S12).

Then, the reference distance calculation unit 94 calculates the value of the first geographical surface distance D1 and the value of the second geographical surface distance D2 (S13).

Then, the reference distance calculation unit 94 checks whether or not a value obtained by subtracting the value of the geographical surface reference distance D represented by the geographical surface reference distance data stored in the reference distance data storage unit 96 from the value of the first geographical surface distance D1 and a value obtained by subtracting the value of the geographical surface reference distance D represented by the geographical surface reference distance data stored in the reference distance data storage unit 96 from the value of the second geographical surface distance D2 are both larger than the geographical surface reference distance buffer delta-D (S14).

In S14, when the condition specified in S14 is satisfied (S14:Y), the reference distance calculation unit 94 updates the value of the geographical surface reference distance D represented by the geographical surface reference distance data stored in the reference distance data storage unit 96 to a smaller one of the value of the first geographical surface distance D1 and the value of the second geographical surface distance D2 (S15). Then, the pitch angle change center point position modification unit 122 modifies the position of the pitch angle change center point 80 and the position of the viewpoint 66 (S16).

When the condition specified in S14 is not satisfied (S14:N), the reference distance calculation unit 94 checks whether or not a value obtained by subtracting the value of the first geographical surface distance D1 from the value of the geographical surface reference distance D represented by the geographical surface reference distance data stored in the reference distance data storage unit 96 and a value obtained by subtracting the value of the second geographical surface distance D2 from the value of the geographical surface reference distance D represented by the geographical surface reference distance data stored in the reference distance data storage unit 96 are both larger than the geographical surface reference distance buffer delta-D (S17). Here, when the condition specified in S17 is not satisfied (S17:N), the process of S19 is performed.

In S17, when the condition specified in S17 is satisfied (S17:Y), the reference distance calculation unit 94 updates the value of the geographical surface reference distance D represented by the geographical surface reference distance data stored in the reference distance data storage unit 96 to a larger one of the value of the first geographical surface distance D1 and the value of the second geographical surface distance D2 (S18). Then, the pitch angle change center point position modification unit 122 modifies the position of the pitch angle change center point 80 and the position of the viewpoint 66 (S16).

The viewpoint position modification unit 120 calculates the viewpoint-to-geographical surface distance d2 (S19). Then, the viewpoint position modification unit 120 checks whether or not the value of the viewpoint-to-geographical surface distance d2 is smaller than the minimum viewpoint-to-geographical surface distance d2 min (S20).

In a case where the value of the viewpoint-to-geographical surface distance d2 is smaller than the minimum viewpoint-to-geographical surface distance d2 min (S20:Y), the viewpoint position modification unit 120 modifies the position of the viewpoint 66 to a position at which the value of the viewpoint-to-geographical surface distance d2 becomes equal to or larger than the minimum viewpoint-to-geographical surface distance d2 min (S21). In a case where the value of the viewpoint-to-geographical surface distance d2 is not smaller than the minimum viewpoint-to-geographical surface distance d2 min (S20:N), the process of S22 is performed.

The virtual space display unit 86 displays an image rendering a scene viewed from the viewpoint 66 in the line of sight 68 in the virtual space 64 on the screen of the monitor 26, based on the current position of the viewpoint 66 and the current position of the pitch angle change center point 80 (S22).

In the manner as described above, the position of the viewpoint 66 or the position of the pitch angle change center point 80 is moved according to the operation performed by the user, and an image is displayed on the screen of the monitor 26, the image depicting the virtual space 64 based on the moved position of the viewpoint 66 and the moved position of the pitch angle change center point 80.

It should be noted that the present invention is not limited to the above-mentioned embodiment.

In the following, a modified embodiment of the present invention is described with reference to a flow chart of FIG. 15. Description of the matters shared with the above-mentioned embodiment is omitted.

Figure 17:
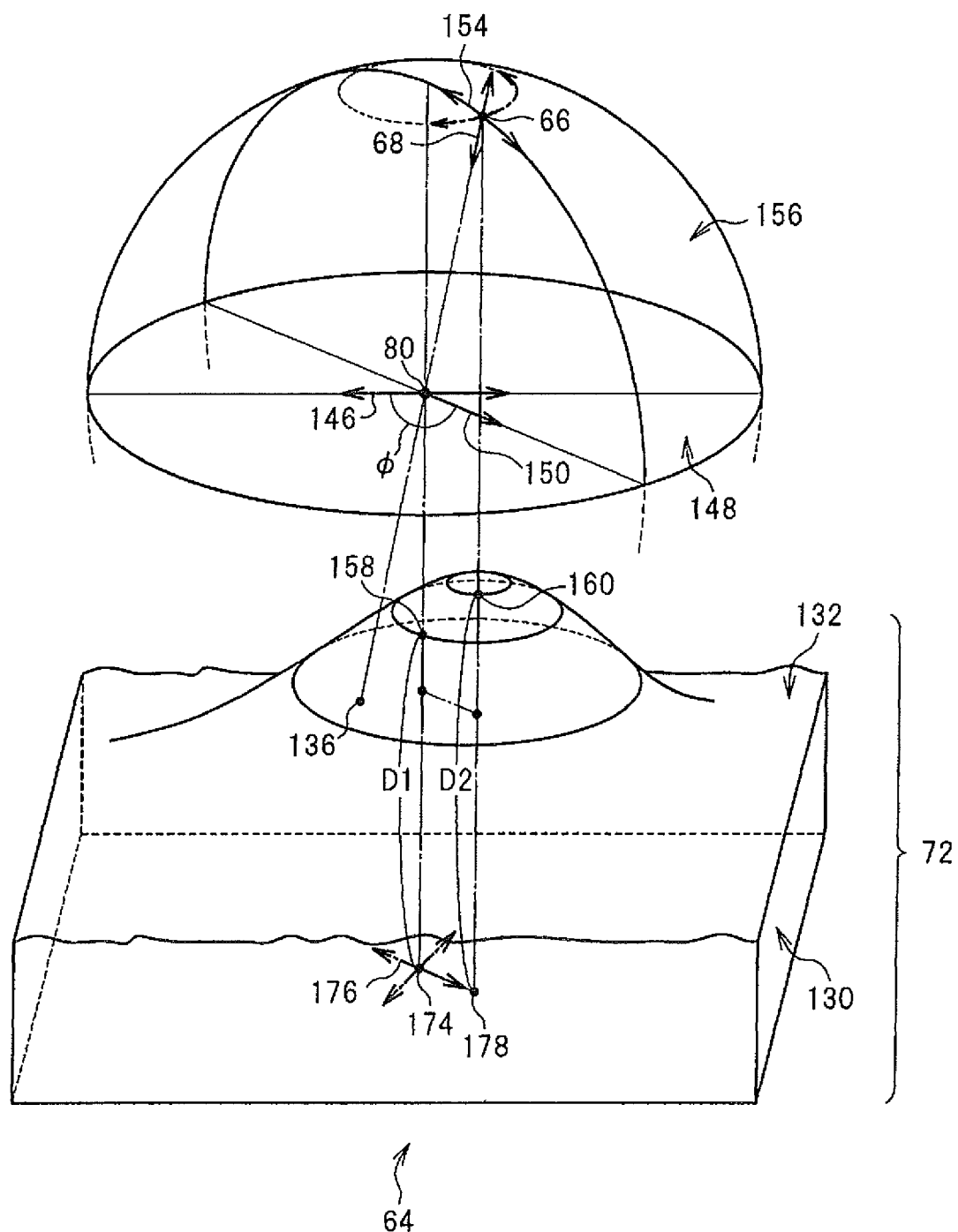
FIG. 17 is an explanatory diagram illustrating an example of a relation of a virtual Earth object with respect to a position of a viewpoint and a line of sight according to the another embodiment of the present invention.

In this embodiment, the viewpoint data storage unit 88 stores the viewpoint data 134 which contains movement reference point position data 164, anterior direction data 166, altitude data 168, viewpoint height data 170, and pitch angle data 172 (see FIG. 16). FIG. 16 illustrates an example of the data structure of the viewpoint data 134 according to this embodiment. FIG. 17 is an explanatory diagram illustrating an example of a relation of a virtual Earth object with respect to the position of the viewpoint and the line of sight according to this embodiment.

In this embodiment, the movement reference point position data 164 represents a position of a movement reference point 174, which is a point of intersection where a straight line passing through the pitch angle change center point 80 as being perpendicular to the reference surface 130 intersects with the reference surface 130, and is represented by, for example, a three-dimensional coordinate value or data on a latitude and a longitude.

The anterior direction data 166 represents an anterior direction 176 that is perpendicular to the normal of the reference surface 130 and associated with an upward operation of the left operation stick to be described later, and is represented by, for example, three-dimensional vector data.

The altitude data 168 in this embodiment represents an altitude, which is a distance from the movement reference point 174 to the pitch angle change center point projected point 158 in the initial state.

The viewpoint height data 170 in this embodiment represents a viewpoint height, which is a sum of a distance from the pitch angle change center point 80 to the pitch angle change center point projected point 158 and a distance from the pitch angle change center point 80 to the viewpoint 66 in the initial state.

The pitch angle data 172 represents the pitch angle theta.

First, in this embodiment, the operation state acquisition unit 104 acquires the operation state (S51).

In a case where the posture data (X, Y) on the left operation stick 54 has been acquired (S52:Y), the pitch angle change center point moving unit 112 moves, based on the posture data (X, Y) on the left operation stick 54 acquired by the operation state acquisition unit 104, the movement reference point 174 along the reference surface 130 to a position on the coordinates in which the Y-axis direction and the X-axis direction of the left operation stick 54 are associated with the anterior direction 176 and with a direction of 90 degrees to the right with respect to the anterior direction 176, respectively (S53). At this time, the anterior direction data 166 may be changed according to the change in the movement reference point position data 164. It should be noted that the viewpoint height data 170 and the pitch angle data 172 are not changed at this time. On the other hand, the altitude data 168 is changed. Description is given later of how to change the altitude data 168.

In a case where the condition specified in S52 is not satisfied (S52:N), the process of S54 is performed.

In a case where the operation state acquisition unit 104 has acquired the posture data (X,Y) on the right operation stick 56 (S54:Y), the pitch angle change unit 114 increases or decreases the pitch angle theta and changes the anterior direction data 166 (that is, increases or decreases the yaw angle phi), based on the posture data (X, Y) on the right operation stick 56 acquired by the operation state acquisition unit 104 (S55). Specifically, for example, in a case where the value of Y acquired by the operation state acquisition unit 104 is positive (negative), the pitch angle change unit 114 decreases (increases) the value of the pitch angle theta. Meanwhile, in a case where the value of X acquired by the operation state acquisition unit 104 is positive (negative), the anterior direction data 166 is changed so that the anterior direction 176 is turned clockwise (counterclockwise) with respect to the normal of the reference surface 130. In this manner, the pitch angle theta and the yaw angle phi are changed. At this time, the movement reference point position data 164 and the viewpoint height data 170 are not changed. On the other hand, the altitude data 168 is changed. Description is given later of how to change the altitude data 168.

In a case where the condition specified in S54 is not satisfied (S54:N), the process of S56 is performed.

In a case where the operation state acquisition unit 104 has acquired a digital value that indicates a depressing force applied to the second left button 52L or to the second right button 52R and is equal to or larger than a given value (S56: Y), the viewpoint height data 170 is changed (S57). Specifically, for example, in a case where the operation state acquisition unit 104 has acquired a digital value that indicates a depressing force applied to the second left button 52L and is equal to or larger than a given value, the viewpoint moving unit 110 moves the viewpoint 66 in a direction away from the pitch angle change center point 80. In a case where the operation state acquisition unit 104 has acquired a digital value that indicates a depressing force applied to the second right button 52R and is equal to or larger than a given value, the viewpoint moving unit 110 moves the viewpoint 66 in a direction of approaching the pitch angle change center point 80. The anterior direction data 166, the movement reference point position data 164, and the pitch angle data 172 are not changed at this time. On the other hand, the altitude data 168 is changed. Description is given later of how to change the altitude data 168.

In a case where the condition specified in S56 is not satisfied (S56:N), the process of S58 is performed.

Then, the pitch angle change center point position modification unit 122 changes the altitude data 168 (S58).

Specifically, for example, the first geographical surface distance D1 and the second geographical surface distance D2 are measured. The first geographical surface distance D1 is a distance between the pitch angle change center point projected point 158 and the reference surface 130, and the second geographical surface distance D2 is a distance between the viewpoint projected point 160 and the reference surface 130. Here, a viewpoint reference point 178 is a point of intersection where a straight line passing through the viewpoint projected point 160 as being perpendicular to the reference surface 130 intersects with the reference surface 130. Here, the pitch angle change center point position modification unit 122 may obtain, by using the data on the latitude and longitude of the viewpoint reference point 178, the latitude and longitude of the movement reference point 174 from an altitude database in which the latitude and longitude are associated with the altitude, and may calculate the first geographical surface distance D1 based on data representing the latitude and longitude of the movement reference point 174, while calculating the second geographical surface distance D2 based on data on the latitude and longitude of the viewpoint reference point 178.

The pitch angle change center point position modification unit 122 changes the altitude data 168. Specifically, for example, when a difference between the value of the altitude represented by the altitude data 168 and the value of the first geographical surface distance D1 and a difference between the value of the altitude represented by the altitude data 168 and the value of the second geographical surface distance D2 both fall out of a predetermined range (for example, 0.1 times as large as the value of viewpoint height), the altitude data 168 is updated. At this time, the predetermined range may preferably set to be smaller than a viewpoint height internal division rate (for example, 0.2) to be described later so that the viewpoint 66 does not run into the geographical surface 132.

Here, for example, in a case where a value obtained by subtracting a value that is 0.1 times as large as the value of the viewpoint height from a smaller one of the value of the first geographical surface distance D1 and the value of the second geographical surface distance D2 is smaller than the value of the altitude, the pitch angle change center point position modification unit 122 changes the value of the altitude to the value obtained by subtracting the value that is 0.1 times as large as the value of the viewpoint height from the smaller one of the value of the first geographical surface distance D1 and the value of the second geographical surface distance D2. On the other hand, in a case where the value obtained by adding the value that is 0.1 times as large as the value of the viewpoint height to a larger one of the value of the first geographical surface distance D1 and the value of the second geographical surface distance D2 is larger than the value of the altitude, the pitch angle change center point position modification unit 122 changes the value of the altitude to the value obtained by adding the value that is 0.1 times as large as the value of the viewpoint height to the larger one of the value of the first geographical surface distance D1 and the value of the second geographical surface distance D2. In this manner, the value of the altitude falls within a range between the value obtained by subtracting the value that is 0.1 times as large as the value of the viewpoint height from the smaller one of the value of the first geographical surface distance D1 and the value of the second geographical surface distance D2 and the value obtained by adding the value that is 0.1 times as large as the value of the viewpoint height to the larger one of the value of the first geographical surface distance D1 and the value of the second geographical surface distance D2.

Then, the pitch angle change center point moving unit 112 moves the position of the pitch angle change center point 80, and the viewpoint moving unit 110 moves the position of the viewpoint 66 (S59). Specifically, the pitch angle change center point moving unit 112 changes the pitch angle change center point 80 to a point separated from the movement reference point 174 in a direction perpendicular to the reference surface 130, by a distance obtained by adding the value of the altitude to a value obtained by multiplying the viewpoint height by the viewpoint height internal division rate (for example, 0.2) as a given rate. Then, the viewpoint moving unit 110 moves the position of the viewpoint 66 about the pitch angle change center point 80 in a direction that forms the pitch angle theta with respect to a direction perpendicular to the reference surface 130 in a direction opposite to the anterior direction 176, to a point separated from the pitch angle change center point 80 by a distance represented by a value obtained by multiplying the viewpoint height by a ratio (for example, 0.8) remaining after the viewpoint height internal division rate is subtracted from 1.

The virtual space display unit 86 displays an image rendering a scene viewed from the viewpoint 66 in the line of sight 68 in the virtual space 64 on the screen of the monitor 26, based on the current position of the viewpoint 66 and the current position of the pitch angle change center point 80 (S60).

It should be noted that the present invention is not limited to the above-mentioned embodiment, either.

For example, in the above-mentioned embodiment, a single virtual object is disposed inside the virtual space 64. However, a plurality of virtual objects may be disposed inside the virtual space 64.

The invention claimed is:

1. An image display device for displaying an image rendering a scene viewed from a viewpoint in a virtual space in a line of sight, the virtual space having at least one virtual object disposed therein, the image display device comprising:
   viewpoint moving unit configured to perform at least one of a process of moving a position of the viewpoint and a process of changing the line of sight, according to a viewpoint moving operation performed by a user;
   pitch angle change center point position calculation unit configured to calculate a position of a pitch angle change center point which exists a given distance away from the viewpoint on a straight line extending from the viewpoint in the line of sight; and
   pitch angle change unit configured to rotate the viewpoint about the pitch angle change center point keeping the line of sight so that the line of sight is directed to the pitch angle change center point by changing a pitch angle of the viewpoint about the pitch angle change center point according to a pitch angle change operation performed by the user.

2. The image display device according to claim 1, wherein the pitch angle change center point position calculation unit is configured to calculate, as the position of the pitch angle change center point, a position of a point which internally divides a distance between a position indicating a point of gaze and the position of the viewpoint at a given ratio.

3. The image display device according to claim 1, further comprising pitch angle change center point moving unit configured to move the position of the pitch angle change center point according to a pitch angle change center point moving operation performed by the user, and changing at least the line of sight so that the line of sight is directed to the pitch angle change center point from the position of the viewpoint.

4. The image display device according to claim 1, wherein the virtual object renders the Earth.

5. A method for controlling an image display device for displaying an image rendering a scene viewed from a viewpoint in a virtual space in a line of sight, the virtual space having at least one virtual object disposed therein, the method for controlling an image display device comprising the steps of:
   performing at least one of a process of moving a position of the viewpoint and a process of changing the line of sight, according to a viewpoint moving operation performed by a user;
   calculating a position of a pitch angle change center point which exists a given distance away from the viewpoint on a straight line extending from the viewpoint in the line of sight; and
   rotating the viewpoint about the pitch angle change center point keeping the line of sight so that the line of sight is directed to the pitch angle change center point by changing a pitch angle of the viewpoint about the pitch angle change center point according to a pitch angle change operation performed by the user.

6. A non-transitory, computer-readable information storage medium storing a program for controlling a computer to function as an image display device for displaying an image rendering a scene viewed from a viewpoint in a virtual space in a line of sight, the virtual space having at least one virtual object disposed therein, the computer-readable information storage medium storing the program for controlling the computer to carry out actions, comprising:
   performing at least one of a process of moving a position of the viewpoint and a process of changing the line of sight, according to a viewpoint moving operation performed by a user;
   calculating a position of a pitch angle change center point which exists a given distance away from the viewpoint on a straight line extending from the viewpoint in the line of sight; and
   rotating the viewpoint about the pitch angle change center point keeping the line of sight so that the line of sight is directed to the pitch angle change center point by changing a pitch angle of the viewpoint about the pitch angle change center point according to a pitch angle change operation performed by the user.

7. An image display device for displaying an image rendering a scene depicting a view field region which is defined based on a viewpoint and a line of sight in a virtual space having a virtual object disposed therein, the image display device comprising:
   viewpoint movement speed determination unit configured to determine a movement speed of the viewpoint, based on a virtual object-to-viewpoint distance which is a distance based on a relation between a position indicating the virtual object included in the view field region and a position indicating the viewpoint in a manner that the value of the movement speed of the viewpoint increases as the distance between the viewpoint and the virtual object increases, according to a viewpoint moving operation performed by a user; and
   viewpoint moving unit configured to move the position of the viewpoint at the movement speed determined by the viewpoint movement speed determination unit.

8. The image display device according to claim 7, wherein the viewpoint movement speed determination unit is configured to determine the movement speed so that the movement speed increases in value as the virtual object-to-viewpoint distance increases in value.

9. The image display device according to claim 7, further comprising viewpoint position modification unit configured to measure, when the viewpoint moving unit moves the viewpoint, a distance between the position indicating the viewpoint and the position indicating the virtual object, and modifying, in a case where the distance is smaller than a given distance, the position of the viewpoint in a direction away from the virtual object.

10. The image display device according to claim 7, further comprising:
   pitch angle change unit configured to rotate the viewpoint about a pitch angle change center point, which exists a given distance away from the viewpoint on a straight line extending from the viewpoint in the line of sight, keeping the line of sight so that the line of sight is directed to the pitch angle change center point from a current position of the viewpoint, by changing the pitch angle about the pitch angle change center point according to a pitch angle change operation performed by the user; and pitch angle change center point position modification unit configured to measure, when the viewpoint moving unit moves the viewpoint, a distance between a position indicating the pitch angle change center point and the position indicating the virtual object, and modifying, in a case where the distance exceeds a given range, the position of the pitch angle change center point so that the distance falls within the given range.

11. The image display device according to claim 7, wherein the virtual object renders the Earth.

12. A method for controlling an image display device for displaying an image rendering a scene depicting a view field region viewed from a viewpoint in a virtual space having a virtual object disposed therein, the method for controlling an image display device, comprising the steps of:

determining a movement speed of the viewpoint, based on a virtual object-to-viewpoint distance which is a distance based on a relation between a position indicating the virtual object included in the view field region and a position indicating the viewpoint in a manner that the value of the movement speed of the viewpoint increases as the distance between the viewpoint and the virtual object increases, according to a viewpoint moving operation performed by a user; and moving the position of the viewpoint at the movement speed determined in the viewpoint movement speed determination step.

13. A non-transitory, computer-readable information storage medium storing a program for controlling a computer to function as an image display device for displaying an image rendering a scene depicting a view field region viewed from a viewpoint in a virtual space having a virtual object disposed therein, the computer-readable information storage medium storing the program for controlling the computer to carry out actions, comprising:

determining a movement speed of the viewpoint, based on a virtual object-to-viewpoint distance, which is a distance based on a relation between a position indicating the virtual object included in the view field region and a position indicating the viewpoint in a manner that the value of the movement speed of the viewpoint increases as the distance between the viewpoint and the virtual object increases, according to a viewpoint moving operation performed by a user; and moving the position of the viewpoint at the movement speed determined by the viewpoint movement speed determination action.

14. An image display device for displaying an image rendering a scene depicting a view field region determined based on a viewpoint and a line of sight in a virtual space having a virtual object disposed therein, the image display device comprising:

allowable range calculation unit configured to calculate an allowable range for moving a position of the viewpoint and/or an allowable range for changing the line of sight, based on a size of a region where the view field region overlaps with a closed region occupied by the virtual object; and viewpoint moving unit configured to perform a process of moving the position of the viewpoint and/or a process of changing the line of sight within the allowable range, according to a viewpoint moving operation performed by a user, wherein the allowable range calculation unit calculates the position of the viewpoint and/or the line of sight when the line of sight is equivalent to a tangent line direction with respect to the closed region, as a boundary between an inside and an outside of the allowable range.

15. The image display device according to claim 14, further comprising pitch angle change unit configured to rotate the viewpoint about a pitch angle change center point, which exists a given distance away from the viewpoint on a straight line extending from the viewpoint in the line of sight, keeping the line of sight so that the line of sight is directed to the pitch angle change center point by from a current position of the viewpoint, by changing a pitch angle about the pitch angle change center point according to a pitch angle change operation performed by the user, and changing the line of sight so that the line of sight is directed to the pitch angle change center point from the position of the viewpoint with the pitch angle thus changed, wherein the allowable range calculation unit calculates the position of the viewpoint and/or the line of sight when a straight line passing through the pitch angle change center point and the viewpoint extends in a direction equivalent to a tangent line direction with respect to the closed region, as a boundary between an inside and an outside of the allowable range.

16. The image display device according to claim 15, wherein:

the allowable range calculation unit calculates a pitch angle range; and the pitch angle change unit changes the pitch angle within the pitch angle range calculated by the allowable range calculation unit.

17. The image display device according to claim 16, further comprising:

relative pitch angle data storage unit configured to store relative pitch angle data representing a ratio of an angle formed by the straight line passing through the pitch angle change center point and the viewpoint, and, a straight line passing through the pitch angle change center point and being perpendicular to a region rendering the virtual object, with respect to a maximum pitch angle which is a maximum value in the pitch angle range calculated by the allowable range calculation unit;

relative pitch angle data change unit configured to change the relative pitch angle data stored in the relative pitch angle data storage unit, according to a relative pitch angle change operation performed by the user; and pitch angle calculation unit configured to calculate the pitch angle, based on the ratio with respect to the maximum pitch angle represented by the relative pitch angle data and the maximum pitch angle, wherein the pitch angle change unit changes the pitch angle, based on the pitch angle calculated by the pitch angle calculation unit and a position of the pitch angle change center point.

18. The image display device according to claim 14, wherein the virtual object renders the Earth.

19. A method for controlling an image display device for displaying an image rendering a scene depicting a view field region which is defined based on a viewpoint and a line of sight in a virtual space having a virtual object disposed therein, the method for controlling an image display device, comprising the steps of:

calculating an allowable range for moving a position of the viewpoint and/or an allowable range for changing the line of sight, based on a size of a region where the view field region overlaps with a closed region occupied by the virtual object; and performing a process of moving the position of the viewpoint and/or a process of changing the line of sight within the allowable range, according to a viewpoint moving operation performed by a user, wherein, in calculating the allowable range, calculating the position of the viewpoint and/or the line of sight when the line of sight is equivalent to a tangent line direction with respect to the closed region, as a boundary between an inside and an outside of the allowable range.

20. A non-transitory, computer-readable information storage medium storing a program for controlling a computer to function as an image display device for displaying an image rendering a scene depicting a view field region which is defined based on a viewpoint and a line of sight in a virtual space having a virtual object disposed therein, the computer-readable information storage medium storing the program for controlling the computer to carry out actions, comprising:

calculating an allowable range for moving a position of the viewpoint and/or an allowable range for changing the line of sight, based on a size of a region where the view field region overlaps with a closed region occupied by the virtual object; and performing a process of moving the position of the viewpoint and/or a process of changing the line of sight within the allowable range, according to a viewpoint moving operation performed by a user, wherein the calculating action includes calculating the position of the viewpoint and/or the line of sight when the line of sight is equivalent to a tangent line direction with respect to the closed region, as a boundary between an inside and an outside of the allowable range.

* * * * *